United States Patent
Kim et al.

(10) Patent No.: US 10,108,230 B2
(45) Date of Patent: Oct. 23, 2018

(54) ELECTRONIC DEVICE INCLUDING FLEXIBLE DISPLAY

(71) Applicant: Samsung Electronics Co., Ltd., Gyeonggi-do (KR)

(72) Inventors: Minsoo Kim, Gyeongsangbuk-do (KR); Jaehwan Kim, Gyeongsangbuk-do (KR); Jinman Kim, Gyeongsangbuk-do (KR); Youngtae Jeong, Daegu (KR)

(73) Assignee: Samsung Electronics Co., Ltd (KR)

( * ) Notice: Subject to any disclaimer, the term of this patent is extended or adjusted under 35 U.S.C. 154(b) by 163 days.

(21) Appl. No.: 14/877,437

(22) Filed: Oct. 7, 2015

(65) Prior Publication Data
US 2016/0098132 A1 Apr. 7, 2016

(30) Foreign Application Priority Data
Oct. 7, 2014 (KR) ........................ 10-2014-0134737

(51) Int. Cl.
*G06F 3/041* (2006.01)
*G06F 1/16* (2006.01)
*G02F 1/1333* (2006.01)

(52) U.S. Cl.
CPC .......... *G06F 1/1652* (2013.01); *G06F 1/1684* (2013.01); *G06F 3/0416* (2013.01); *G02F 1/133305* (2013.01); *G02F 1/133308* (2013.01); *G06F 2203/04102* (2013.01)

(58) Field of Classification Search
CPC ......... G06F 1/1652; G06F 2203/04102; G06F 1/1684; G06F 3/0416; G09G 2380/02; H04M 1/0268; G02F 1/133305; G02F 1/133308; G09F 9/301; H01L 2251/5338
See application file for complete search history.

(56) References Cited

U.S. PATENT DOCUMENTS

| | | | |
|---|---|---|---|
| 5,610,528 A | 3/1997 | Neely et al. | |
| 6,127,672 A * | 10/2000 | Danisch | G01B 11/18 250/227.14 |
| 6,243,074 B1 * | 6/2001 | Fishkin | G06F 1/16 345/156 |
| 6,243,075 B1 * | 6/2001 | Fishkin | G06F 1/16 345/156 |
| 6,943,773 B2 * | 9/2005 | Wong | G06F 1/1626 345/156 |
| 7,109,967 B2 * | 9/2006 | Hioki | G06F 3/0412 345/104 |

(Continued)

*Primary Examiner* — Michael J Jansen, II
(74) *Attorney, Agent, or Firm* — The Farrell Law Firm, P.C.

(57) ABSTRACT

An electronic device including a flexible display and a method capable of determining a bending direction of the flexible display by using at least one bending confirmation touch recognition pattern are provided. The electronic device includes a flexible display unit including a display panel and a support structure configured to support the display panel; a sensor unit configured to sensing bending of the flexible display unit; and a control unit configured to determine a bending extent and a bending direction of the flexible display unit based on a sensing result of the sensor unit, wherein a plurality of touch recognition patterns are arranged on the display panel and the support structure, and the arranged touch recognition patterns include a bending confirmation pattern.

12 Claims, 22 Drawing Sheets

(56) References Cited

U.S. PATENT DOCUMENTS

| | | | |
|---|---|---|---|
| 7,394,452 B2* | 7/2008 | Wong | G06F 1/1626 345/156 |
| 7,443,380 B2* | 10/2008 | Nozawa | G06F 1/1626 345/156 |
| 7,456,823 B2* | 11/2008 | Poupyrev | G06F 3/011 178/18.06 |
| 8,063,330 B2* | 11/2011 | Karhiniemi | G06F 3/044 200/600 |
| 8,072,437 B2* | 12/2011 | Miller | G06F 3/0414 345/173 |
| 8,271,047 B2* | 9/2012 | Kim | G06F 1/1615 345/156 |
| 8,319,725 B2* | 11/2012 | Okamoto | G02F 1/133305 345/107 |
| 8,466,873 B2* | 6/2013 | Vertegaal | G06F 3/017 345/156 |
| 8,502,788 B2* | 8/2013 | Cho | G06F 1/1626 345/173 |
| 8,543,166 B2* | 9/2013 | Choi | G06F 1/1601 345/156 |
| 8,553,008 B2* | 10/2013 | Cho | G06F 3/0488 345/173 |
| 8,581,859 B2* | 11/2013 | Okumura | G06F 1/1626 345/173 |
| 8,587,539 B2* | 11/2013 | Tziortzis | G06F 1/1641 345/156 |
| 8,610,663 B2* | 12/2013 | Kim | G06F 3/033 345/156 |
| 8,654,087 B2* | 2/2014 | Kang | G06F 1/1626 345/173 |
| 8,666,455 B2* | 3/2014 | Song | H04M 1/0268 455/566 |
| 8,669,956 B2* | 3/2014 | Cho | G06F 3/0488 345/173 |
| 8,842,090 B1* | 9/2014 | Cho | G06F 3/0412 345/173 |
| 8,854,332 B1* | 10/2014 | Cho | G06F 3/0412 345/173 |
| 8,890,911 B2* | 11/2014 | Moriwaki | G09G 3/3208 345/1.3 |
| 8,896,202 B2* | 11/2014 | Oh | H01L 51/5237 313/511 |
| 8,928,594 B2* | 1/2015 | Chang | G06F 1/1615 178/18.01 |
| 8,928,619 B1* | 1/2015 | Cho | G06F 1/1652 345/173 |
| 8,929,085 B2* | 1/2015 | Franklin | G06F 1/1626 361/749 |
| 8,963,857 B2* | 2/2015 | Kim | G06F 3/0487 345/173 |
| 8,970,455 B2* | 3/2015 | Thorson | G06F 3/147 345/105 |
| 8,982,106 B2* | 3/2015 | Moriwaki | G09G 3/20 345/204 |
| 8,988,381 B1* | 3/2015 | Kim | G06F 1/1652 345/108 |
| 9,007,300 B2* | 4/2015 | Hirsch | G06F 1/1694 345/156 |
| 9,013,432 B2* | 4/2015 | Kang | G06F 1/1626 345/173 |
| 9,013,433 B2* | 4/2015 | Kang | G06F 1/1626 345/173 |
| 9,013,884 B2* | 4/2015 | Fukuma | G06F 1/1652 361/749 |
| 9,029,886 B2* | 5/2015 | Namkung | H01L 27/3244 257/95 |
| 9,052,769 B2* | 6/2015 | Choi | G06F 3/0414 |
| 9,069,521 B2* | 6/2015 | Lee | G06F 1/16 |
| 9,075,095 B2* | 7/2015 | Kallassi | G01R 27/2605 |
| 9,110,516 B2* | 8/2015 | Hwang | G06F 3/03 |
| 9,116,567 B2* | 8/2015 | Alberth, Jr. | G06F 1/1694 |
| 9,122,319 B2* | 9/2015 | Kwak | G06F 3/0487 |
| 9,124,865 B2* | 9/2015 | Ko | H04N 13/0022 |
| 9,152,225 B2* | 10/2015 | Park | G06F 3/01 |
| 9,170,698 B2* | 10/2015 | Chang | G06F 1/1615 |
| 9,177,501 B2* | 11/2015 | Moriwaki | G09G 3/3208 |
| 9,195,332 B2* | 11/2015 | Arrasvuori | G06F 3/0412 |
| 9,228,907 B2* | 1/2016 | Salo | G01L 1/04 |
| 9,229,563 B2* | 1/2016 | Park | G06F 3/044 |
| 9,239,594 B2* | 1/2016 | Lee | G06F 1/1652 |
| 9,244,554 B2* | 1/2016 | Kung | G06F 3/041 |
| 9,261,914 B2* | 2/2016 | Moriwaki | G09G 3/3208 |
| 9,274,562 B2* | 3/2016 | Franklin | G06F 1/1626 |
| 9,298,297 B2* | 3/2016 | Kim | G06F 3/0412 |
| 9,310,925 B2* | 4/2016 | Fujii | G06F 3/0416 |
| 9,377,873 B2* | 6/2016 | Lee | G06F 3/03 |
| 9,411,423 B2* | 8/2016 | Heubel | G06F 3/0487 |
| 9,436,224 B2* | 9/2016 | Jeong | G06F 1/1652 |
| 9,448,660 B2* | 9/2016 | Seo | G06F 3/0487 |
| 9,454,255 B2* | 9/2016 | El Kallassi | G01R 27/2605 |
| 9,459,656 B2* | 10/2016 | Shai | G06F 1/1615 |
| 9,471,185 B2* | 10/2016 | Guard | G06F 3/0221 |
| 9,489,913 B2* | 11/2016 | Kwak | G06F 3/0487 |
| 9,513,669 B2* | 12/2016 | Jung | G06F 1/1652 |
| 9,513,929 B2* | 12/2016 | Pfeifer | G06F 9/441 |
| 9,524,049 B2* | 12/2016 | Yun | G06F 3/0414 |
| 9,557,862 B2* | 1/2017 | Ho | G06F 3/0416 |
| 9,569,018 B2* | 2/2017 | Kang | G06F 3/03 |
| 9,600,107 B2* | 3/2017 | Kaneyasu | G06F 3/041 |
| 9,606,648 B2* | 3/2017 | Seo | G06F 3/041 |
| 9,646,407 B2* | 5/2017 | Lee | G06F 3/041 |
| 9,672,796 B2* | 6/2017 | Son | G09G 5/40 |
| 9,767,605 B2* | 9/2017 | Arrasvuori | G06T 19/00 |
| 9,772,180 B2* | 9/2017 | Krimon | G01B 11/16 |
| 9,791,981 B2* | 10/2017 | Kang | G06F 3/044 |
| 9,823,833 B2* | 11/2017 | Grant | G06F 3/0488 |
| 9,829,969 B2* | 11/2017 | Yang | G06F 3/01 |
| 9,921,736 B2* | 3/2018 | Seo | G06F 3/0488 |
| 9,939,101 B2* | 4/2018 | Yun | F16M 13/005 |
| 9,952,706 B2* | 4/2018 | Cho | G06F 3/0416 |
| 9,952,724 B2* | 4/2018 | Akimoto | G06F 3/044 |
| 9,960,213 B2* | 5/2018 | Senda | H01L 27/323 |
| 9,983,628 B2* | 5/2018 | Kim | G06F 3/0487 |
| 9,990,055 B2* | 6/2018 | Seo | G06F 3/0487 |
| 2002/0167481 A1* | 11/2002 | Wong | G06F 1/1626 345/156 |
| 2003/0227441 A1* | 12/2003 | Hioki | G06F 3/0412 345/156 |
| 2004/0008191 A1* | 1/2004 | Poupyrev | G06F 3/011 345/184 |
| 2005/0140646 A1* | 6/2005 | Nozawa | G06F 1/1626 345/156 |
| 2005/0184956 A1* | 8/2005 | Wong | G06F 1/1626 345/156 |
| 2006/0238494 A1* | 10/2006 | Narayanaswami | G06F 3/002 345/156 |
| 2006/0274036 A1* | 12/2006 | Hioki | G06F 3/0412 345/156 |
| 2007/0085845 A1* | 4/2007 | Kikuchi | G06F 3/0412 345/204 |
| 2007/0205997 A1* | 9/2007 | Lieshout | G02F 1/133305 345/204 |
| 2007/0247422 A1* | 10/2007 | Vertegaal | G06F 3/017 345/156 |
| 2008/0018611 A1* | 1/2008 | Serban | G06F 3/0416 345/173 |
| 2008/0180399 A1* | 7/2008 | Cheng | G06F 3/041 345/173 |
| 2008/0303782 A1* | 12/2008 | Grant | G06F 1/1615 345/156 |
| 2008/0314725 A1* | 12/2008 | Karhiniemi | G06F 3/044 200/600 |
| 2009/0066663 A1* | 3/2009 | Chang | G06F 1/1615 345/173 |
| 2009/0219247 A1* | 9/2009 | Watanabe | G06F 1/1615 345/157 |
| 2010/0011291 A1* | 1/2010 | Nurmi | G06F 3/0414 715/702 |
| 2010/0045705 A1* | 2/2010 | Vertegaal | A47G 19/2227 345/661 |

(56) References Cited

U.S. PATENT DOCUMENTS

| | | | | |
|---|---|---|---|---|
| 2010/0056223 A1* | 3/2010 | Choi | G06F 1/1601 | 455/566 |
| 2010/0060548 A1* | 3/2010 | Choi | G06F 3/0414 | 345/1.3 |
| 2010/0117975 A1* | 5/2010 | Cho | G06F 1/1626 | 345/173 |
| 2010/0120470 A1* | 5/2010 | Kim | G06F 1/1615 | 455/566 |
| 2010/0141605 A1* | 6/2010 | Kang | G06F 1/1626 | 345/174 |
| 2010/0164888 A1* | 7/2010 | Okumura | G06F 1/1626 | 345/173 |
| 2010/0188422 A1* | 7/2010 | Shingai | G06F 3/016 | 345/647 |
| 2010/0277448 A1* | 11/2010 | Okamoto | G02F 1/133305 | 345/206 |
| 2011/0050586 A1* | 3/2011 | Miller | G06F 3/0412 | 345/173 |
| 2011/0057873 A1* | 3/2011 | Geissler | G06F 1/1626 | 345/156 |
| 2011/0134087 A1* | 6/2011 | Moriwaki | G09G 3/20 | 345/204 |
| 2011/0134144 A1* | 6/2011 | Moriwaki | G09G 3/3208 | 345/660 |
| 2011/0134145 A1* | 6/2011 | Moriwaki | G09G 3/3208 | 345/660 |
| 2011/0227822 A1* | 9/2011 | Shai | G06F 1/1615 | 345/156 |
| 2012/0038613 A1* | 2/2012 | Choi | G06F 1/1652 | 345/211 |
| 2012/0092363 A1* | 4/2012 | Kim | G06T 5/006 | 345/618 |
| 2012/0112994 A1* | 5/2012 | Vertegaal | G06F 3/017 | 345/156 |
| 2012/0139834 A1* | 6/2012 | Han | G06F 3/03 | 345/157 |
| 2012/0188153 A1* | 7/2012 | Tziortzis | G06F 1/1641 | 345/156 |
| 2012/0260220 A1* | 10/2012 | Griffin | G06F 3/033 | 715/863 |
| 2012/0319960 A1* | 12/2012 | Kildal | G06F 3/0487 | 345/173 |
| 2012/0329528 A1* | 12/2012 | Song | H04M 1/0268 | 455/566 |
| 2013/0070431 A1* | 3/2013 | Fukuma | G06F 1/1652 | 361/749 |
| 2013/0083496 A1* | 4/2013 | Franklin | G06F 1/1626 | 361/749 |
| 2013/0093660 A1* | 4/2013 | Hirsch | G06F 1/1652 | 345/156 |
| 2013/0100053 A1* | 4/2013 | Kang | G06F 3/03 | 345/173 |
| 2013/0127748 A1* | 5/2013 | Vertegaal | A47G 19/2227 | 345/173 |
| 2013/0154970 A1* | 6/2013 | Seo | G06F 3/0488 | 345/173 |
| 2013/0154971 A1* | 6/2013 | Kang | G06F 3/0414 | 345/173 |
| 2013/0155052 A1* | 6/2013 | Ko | H04N 13/0022 | 345/419 |
| 2013/0169520 A1* | 7/2013 | Cho | G06F 3/0488 | 345/156 |
| 2013/0169562 A1* | 7/2013 | Cho | G06F 3/0488 | 345/173 |
| 2013/0201093 A1* | 8/2013 | Kim | G06F 3/033 | 345/156 |
| 2013/0201115 A1* | 8/2013 | Heubel | G06F 3/0487 | 345/173 |
| 2013/0215035 A1* | 8/2013 | Guard | G06F 3/0221 | 345/168 |
| 2013/0215041 A1* | 8/2013 | Kim | G06F 3/0487 | 345/173 |
| 2013/0215088 A1* | 8/2013 | Son | G09G 5/40 | 345/204 |
| 2013/0221840 A1* | 8/2013 | Oh | H01L 51/5237 | 313/511 |
| 2013/0222222 A1* | 8/2013 | Arrasvuori | G06T 19/00 | 345/156 |
| 2013/0265221 A1* | 10/2013 | Lee | G06F 3/01 | 345/156 |
| 2013/0265257 A1* | 10/2013 | Jung | G06F 3/0412 | 345/173 |
| 2013/0265260 A1* | 10/2013 | Seo | G06F 3/041 | 345/173 |
| 2013/0265262 A1* | 10/2013 | Jung | G06F 3/041 | 345/173 |
| 2013/0285922 A1* | 10/2013 | Alberth, Jr. | G06F 1/1694 | 345/173 |
| 2013/0293453 A1* | 11/2013 | Hwang | G06F 3/03 | 345/156 |
| 2013/0293455 A1* | 11/2013 | Yang | G06F 3/01 | 345/156 |
| 2013/0307816 A1* | 11/2013 | Lee | G06F 1/1652 | 345/174 |
| 2013/0321264 A1* | 12/2013 | Park | G06F 3/01 | 345/156 |
| 2013/0342509 A1* | 12/2013 | Kang | G06F 1/1626 | 345/174 |
| 2014/0002402 A1* | 1/2014 | Kang | G06F 1/1626 | 345/173 |
| 2014/0002419 A1* | 1/2014 | Thorson | G06F 3/147 | 345/175 |
| 2014/0009419 A1* | 1/2014 | Kim | G06F 3/0412 | 345/173 |
| 2014/0015743 A1* | 1/2014 | Seo | G06F 1/1694 | 345/156 |
| 2014/0028596 A1* | 1/2014 | Seo | G06F 3/0487 | 345/173 |
| 2014/0028597 A1* | 1/2014 | Cho | G06F 3/0487 | 345/173 |
| 2014/0029017 A1* | 1/2014 | Lee | G01B 11/24 | 356/601 |
| 2014/0035869 A1* | 2/2014 | Yun | G06F 3/0414 | 345/174 |
| 2014/0049464 A1* | 2/2014 | Kwak | G06F 3/0487 | 345/156 |
| 2014/0054438 A1* | 2/2014 | Yun | G06F 1/1652 | 248/550 |
| 2014/0055344 A1* | 2/2014 | Seo | G06F 3/0487 | 345/156 |
| 2014/0055375 A1* | 2/2014 | Kim | G06F 1/1652 | 345/173 |
| 2014/0062859 A1* | 3/2014 | Lee | G06F 3/01 | 345/156 |
| 2014/0065326 A1* | 3/2014 | Lee | G06F 1/16 | 428/12 |
| 2014/0078047 A1* | 3/2014 | Seo | G06F 3/0487 | 345/156 |
| 2014/0085230 A1* | 3/2014 | Sato | G06F 1/1652 | 345/173 |
| 2014/0098028 A1* | 4/2014 | Kwak | G09G 5/00 | 345/173 |
| 2014/0098075 A1* | 4/2014 | Kwak | G06F 3/0487 | 345/204 |
| 2014/0098095 A1* | 4/2014 | Lee | G06F 3/041 | 345/420 |
| 2014/0101560 A1* | 4/2014 | Kwak | G06F 1/1652 | 715/738 |
| 2014/0132553 A1* | 5/2014 | Park | G06F 3/044 | 345/174 |
| 2014/0198036 A1* | 7/2014 | Kim | G06F 1/1652 | 345/156 |
| 2014/0204291 A1* | 7/2014 | Kung | G06F 3/041 | 349/12 |
| 2014/0215201 A1* | 7/2014 | Pfeifer | G06F 9/441 | 713/100 |
| 2014/0238152 A1* | 8/2014 | Kallassi | G01R 27/2605 | 73/862.626 |

(56) References Cited

U.S. PATENT DOCUMENTS

| | | | |
|---|---|---|---|
| 2014/0285417 A1* | 9/2014 | Johan | G06F 3/0488 345/156 |
| 2014/0285449 A1* | 9/2014 | Cho | G06F 3/0412 345/173 |
| 2014/0285450 A1* | 9/2014 | Cho | G06F 3/0412 345/173 |
| 2014/0347273 A1* | 11/2014 | Arrasvuori | G06F 3/0412 345/158 |
| 2014/0361980 A1* | 12/2014 | Iwaki | G06F 3/14 345/156 |
| 2015/0001483 A1* | 1/2015 | Namkung | H01L 27/3244 257/40 |
| 2015/0022445 A1* | 1/2015 | Moriwaki | G09G 3/3208 345/156 |
| 2015/0022732 A1* | 1/2015 | Park | G06F 3/044 349/12 |
| 2015/0049042 A1* | 2/2015 | Fujii | G06F 3/0416 345/174 |
| 2015/0070309 A1* | 3/2015 | Kang | G06F 3/044 345/174 |
| 2015/0084925 A1* | 3/2015 | Chang | G06F 1/1615 345/174 |
| 2015/0116608 A1* | 4/2015 | Jeong | G06F 1/1652 349/12 |
| 2015/0116920 A1* | 4/2015 | Franklin | G06F 1/1626 361/679.26 |
| 2015/0128728 A1* | 5/2015 | Salo | G01L 1/04 73/862.626 |
| 2015/0138699 A1* | 5/2015 | Yamazaki | G06F 1/163 361/679.03 |
| 2015/0169091 A1* | 6/2015 | Ho | G06F 3/0416 345/173 |
| 2015/0185911 A1* | 7/2015 | Kim | G06F 3/044 349/12 |
| 2015/0220119 A1* | 8/2015 | Seo | G06F 3/041 345/173 |
| 2015/0227248 A1* | 8/2015 | Yamazaki | G06F 3/0412 345/173 |
| 2015/0234512 A1* | 8/2015 | Kang | G06F 3/0412 345/173 |
| 2015/0261333 A1* | 9/2015 | Kaneyasu | G06F 3/041 345/173 |
| 2015/0268784 A1* | 9/2015 | Kallassi | G01R 27/2605 345/174 |
| 2015/0286253 A1* | 10/2015 | Jung | G06F 1/1652 361/679.3 |
| 2015/0286288 A1* | 10/2015 | Lee | G06F 3/03 345/173 |
| 2015/0301636 A1* | 10/2015 | Akimoto | G06F 3/044 345/173 |
| 2015/0309611 A1* | 10/2015 | Vertegaal | A47G 19/2227 345/174 |
| 2015/0311260 A1* | 10/2015 | Senda | H01L 51/5253 257/40 |
| 2015/0316958 A1* | 11/2015 | Takesue | G06F 3/044 345/173 |
| 2016/0187122 A1* | 6/2016 | Krimon | G01B 11/16 340/679 |
| 2016/0291762 A1* | 10/2016 | Kim | G06F 3/0488 |
| 2016/0372083 A1* | 12/2016 | Taite | G09G 5/14 |

\* cited by examiner

ELECTRONIC DEVICE INCLUDING FLEXIBLE DISPLAY

PRIORITY

The present invention claims priority under 35 U.S.C. § 119(a) to Korean Patent Application Serial No. 10-2014-0134737, which was filed in the Korean Intellectual Property Office on Oct. 7, 2014, the entire content of which is incorporated herein by reference.

BACKGROUND

1. Field of the Invention

The present invention relates generally to an electronic device including a flexible display, and more particularly to a method and apparatus for detecting bending of a flexible display.

2. Description of the Related Art

With the advancement of electronic technologies, various types of display devices are developed. In particular, the distribution rate of display devices, such as televisions (TVs), Personal Computers (PCs), laptop computers, tablet PCs, portable phones, and motion picture experts' group (MPEG) audio layer-3 (MP3) players, is so great that most homes use display devices.

Recently, in order to satisfy needs of users who desire newer and a greater variety of functions, efforts have been made to develop newer types of display devices. Some of the newer types of displays are called next generation displays. One example of a next generation display device is a flexible display device.

A flexible display device refers is a display device having a deformable characteristic like paper.

Since the shape of the flexible display device may be deformed when a user applies force so as to bend the flexible display device, there is a need for new ways to utilize the shape deformation characteristic of such a flexible display device.

SUMMARY OF THE INVENTION

The present invention has been made to address at least the problems and/or disadvantages described above and to provide at least the advantages described below.

An aspect of the present invention is to address the above-mentioned needs for an electronic device including a flexible display and to provide a method of determining a bending degree and direction of a display panel with respect to an electronic device including a flexible display.

In accordance with an aspect of the present invention, an electronic device including a flexible display is provided. The electronic device includes a flexible display unit including a display panel and a support structure configured to support the display panel; a sensor unit configured to sensing bending of the flexible display unit; and a control unit configured to determine a bending extent and a bending direction of the flexible display unit based on a sensing result of the sensor unit, wherein a plurality of touch recognition patterns are arranged on the display panel and the support structure, and the arranged touch recognition patterns include a bending confirmation pattern.

In accordance with another aspect of the present invention, a method of determining a bending direction of a flexible display unit is provided. The method includes sensing, when the flexible display unit including a display panel and a support structure configured to support the display panel is bent, a change in capacitance of bending confirmation touch recognition patterns included in a plurality of touch recognition patterns arranged on each of the display panel and the support structure; and determining a bending extent and a bending direction of the flexible display unit based on the sensed change in capacitance.

BRIEF DESCRIPTION OF THE DRAWINGS

The above and other aspects, features, and advantages of certain embodiments of the present invention will be more apparent from the following description taken in conjunction with the accompanying drawings, in which:

FIGS. 8A and 8B are diagrams illustrating designs that include at least one of the touch recognition patterns of the flexible display unit of FIG. 7B as a bending confirmation pattern, in which FIG. 8A illustrates a view obtained on an X-Z plane and FIG. 8B illustrates a view obtained on an X-Y plane;

FIGS. 10A and 10B are diagrams illustrating a bent state of the flexible display unit of FIG. 8A and FIG. 8B, which is bent in a first direction, in which FIG. 10A illustrates a view obtained on the X-Z plane and FIG. 10B illustrates a view obtained on the X-Y plane;

FIGS. 11A and 11B are diagrams illustrating a bent state of the flexible display unit of FIG. 8, which is bent in a second direction, in which FIG. 11A illustrates a view obtained on the X-Z plane and FIG. 11B illustrates a view obtained on the X-Y plane;

FIG. 12 is a diagram illustrating a bent state of a flexible display unit of the electronic device, which has fixing portions at both ends thereof and is bent in the second direction, according to various embodiments of the present invention, in which FIG. 12 illustrates a view obtained on the X-Z plane;

FIG. 14 is a diagram illustrating the patterns of the display panel and the support structure of FIG. 12 which are designed to have the same intervals, in which FIG. 14 illustrates a view obtained on the X-Y plane;

FIG. 15 is a diagram illustrating that the intervals between the patterns of FIG. 13 are linearly changed when being deformed at the same curvature, in which FIG. 15 illustrates a view obtained on the X-Y plane;

FIG. 16 is a diagram illustrating the patterns of the display panel and the support structure of FIG. 12 which are designed to have different intervals, in which FIG. 16 illustrates a view obtained on the X-Y plane; and FIG. 17 is a diagram illustrating that the intervals between the patterns are changed at the same intervals when being deformed at the same curvature, in which FIG. 17 illustrates a view obtained on the X-Y plane.

DETAILED DESCRIPTION OF EMBODIMENTS OF THE PRESENT INVENTION

Figure 1:
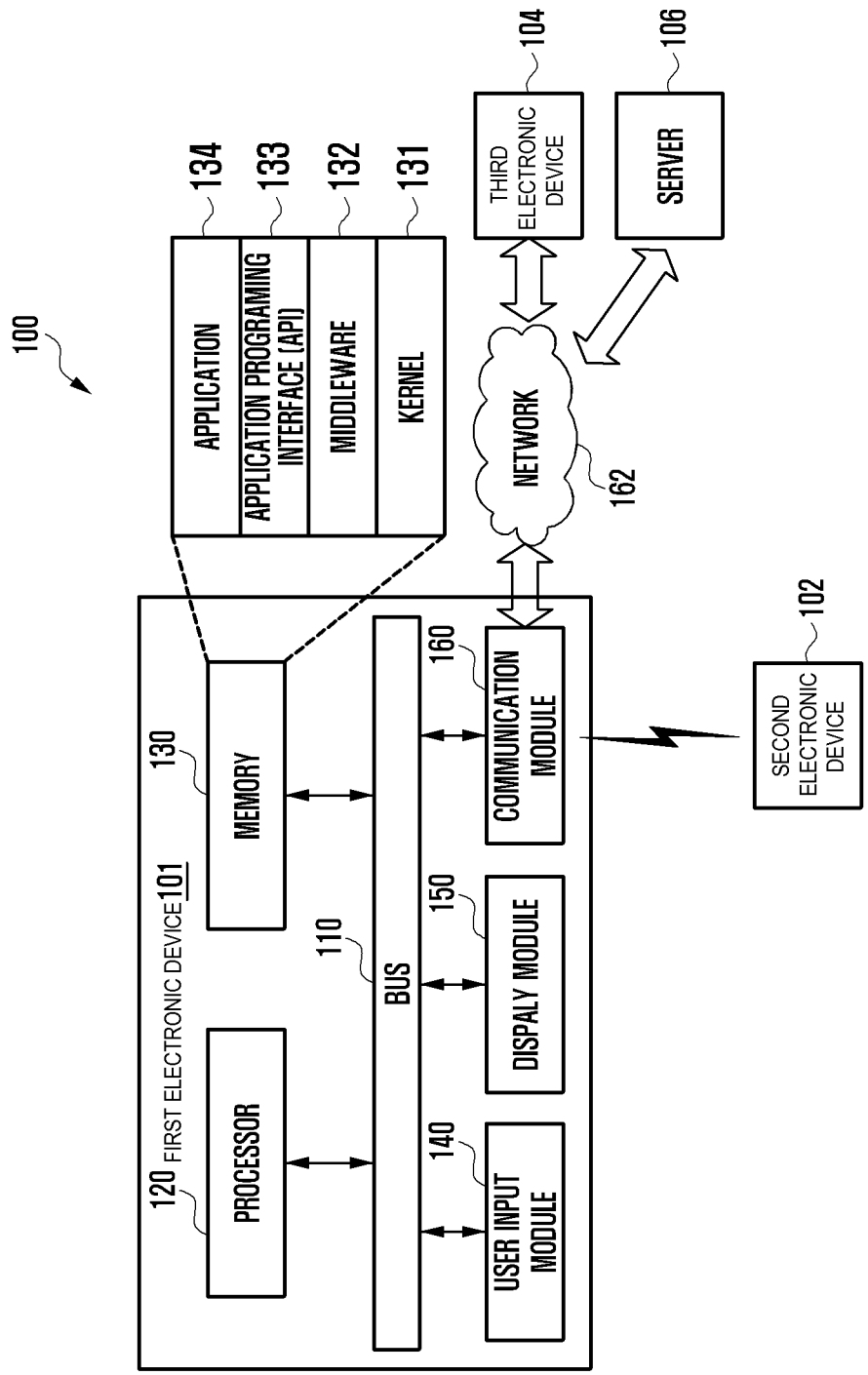
FIG. 1 is a diagram illustrating a network environment including an electronic device according to various embodiments of the present invention.

The following description with reference to the accompanying drawings is provided to assist in a comprehensive understanding of various embodiments of the present invention as defined by the claims and their equivalents. The following description includes various details to assist in that understanding, but these details are to be regarded as mere examples. Accordingly, various changes and modifications of the various embodiments described herein can be made without departing from the scope and spirit of the present invention. In addition, descriptions of well-known functions and constructions may be omitted for clarity and conciseness. In describing the drawings, the same or similar elements may be designated by the same or similar reference numerals.

The terms and words used in the following description and claims are not limited to their dictionary definitions, but, are merely used to enable a clear and consistent understanding of embodiments of the present invention. Accordingly, the following description of various embodiments of the present invention is provided for illustration purposes, and does not limit the present invention as defined by the appended claims and their equivalents.

Herein, the singular forms "a," "an," and "the" include plural referents unless the context clearly dictates otherwise. Thus, for example, reference to "a component surface" includes reference to one or more of such surfaces.

Terms such as "include" and "may include" refer to the presence of the corresponding functions, operations, and constituent elements and do not limit additional functions, operations, and constituent elements. Herein, terms such as "include" and/or "have" may be construed to refer to a certain characteristic, number, step, operation, constituent element, component or a combination thereof, but do not exclude the existence of or a possibility of addition of one or more other characteristics, numbers, steps, operations, constituent elements, components or combinations thereof.

Furthermore, herein, the term "and/or" includes any and all combinations of the associated listed words. For example, the term "A and/or B" may include "A", may include "B", or may include both "A" and "B".

Herein, terms including ordinal numbers, such as "first" and "second," etc., may be used in conjunction with various elements. However, such elements are not limited by the above terms. For example, the above terms do not limit the sequence and/or importance of the elements. The above terms are used merely to distinguish an element from other elements. For example, a first user device and a second user device indicate different user devices, although both are user devices. For example, a first element may be referred to as a second element, and similarly, a second element may also be referred to as a first element without departing from the scope of embodiments of the present invention.

When a component is referred to as being "connected" to or "accessed" by another component, such an expression is not limited to only a situation in which the component is directly connected to or accessed by the other component, but another component or components may exist between them. Meanwhile, when a component is referred to as being "directly connected" or "directly accessed" to other component, there is no component therebetween. The terms used herein are merely used to describe specific various embodiments, and do not limit the present invention. Herein, the singular forms include the plural forms as well, unless the context clearly indicates otherwise.

An electronic device according to the present invention may include a communication function. For example, the device may be a combination of devices including at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (e.g., an air-conditioner, vacuum, an oven, a microwave, a washing machine, an air cleaner, and the like), an artificial intelligence robot, a television (TV), a digital video disc (DVD) player, an audio device, various medical devices (for example, magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present invention is not limited to the aforementioned devices.

FIG. 1 is a block diagram illustrating a configuration of a network environment according to an embodiment of the present invention.

Referring to FIG. 1, a network environment 100 according to an embodiment of the present invention includes a first electronic device 101, a second electronic device 102, a third electronic device 104, a server 106, and network 162. The first electronic device 101 may include a bus 110, a processor 120, a memory 130, a user input module 140, a display module 150, a communication module 160, and other similar and/or suitable components The bus 110 is a circuit that interconnects the above-described elements and delivers a communication (e.g., a control message) between the above-described elements.

The processor 120 receives commands from the above-described other elements (e.g., the memory 130, the user input module 140, the display module 150, the communication module 160, etc.) through the bus 110, interprets the received commands, and executes calculation or data processing according to the interpreted commands.

The memory 130 stores commands or data received from the processor 120 or other elements (e.g., the user input module 140, the display module 150, the communication module 160, etc.) or generated by the processor 120 or the other elements. The memory 130 includes programming modules, such as a kernel 131, middleware 132, an application programming interface (API) 133, an application 134, and the like. Each of the above-described programming modules may be implemented in software, firmware, hardware, or a combination of two or more thereof.

The kernel 131 controls or manages system resources (e.g., the bus 110, the processor 120, the memory 130, etc.) used to execute operations or functions implemented by other programming modules (e.g., the middleware 132, the API 133, and the application 134). The kernel 131 also provides an interface capable of accessing and controlling or managing the individual elements of the first electronic device 101 by using the middleware 132, the API 133, or the application 134.

The middleware 132 serves as a go-between with respect to the API 133 or the application 134 and the kernel 131 such that the API 133 or the application 134 communicates with the kernel 131 and exchanges data therewith. Also, in relation to work requests received from one or more applications 134 and/or the middleware 132, for example, the API 133 performs load balancing of the work requests by using a method of assigning a priority, in which system resources (e.g., the bus 110, the processor 120, the memory 130, etc.) of the first electronic device 101 can be used, to at least one of the one or more applications 134.

The API 133 is an interface through which the application 134 is capable of controlling a function provided by the kernel 131 or the middleware 132, and may include, for example, at least one interface or function for file control, window control, image processing, character control, or the like.

The user input module 140, for example, receives commands or data as input from a user, and delivers the received commands or data to the processor 120 or the memory 130 through the bus 110. The display module 150 displays video, images, data, or the like to the user.

The communication module 160 connects communication between the second electronic device 102 and the first electronic device 101. The communication module 160 may support a predetermined short-range communication protocol (e.g., Wi-Fi, bluetooth (BT), and near field communication (NFC)), or a predetermined network communication (e.g., the Internet, a local area network (LAN), a wide area network (WAN), a telecommunication network, a cellular network, a satellite network, a plain old telephone service (POTS), or the like). Each of the second and third electronic devices 102 and 104 may be identical (e.g., of an identical type) to or different (e.g., of a different type) from the first electronic device 101. Further, the communication module 160 connects communication between a server 164 and the first electronic device 101 via the network 162.

Figure 2:
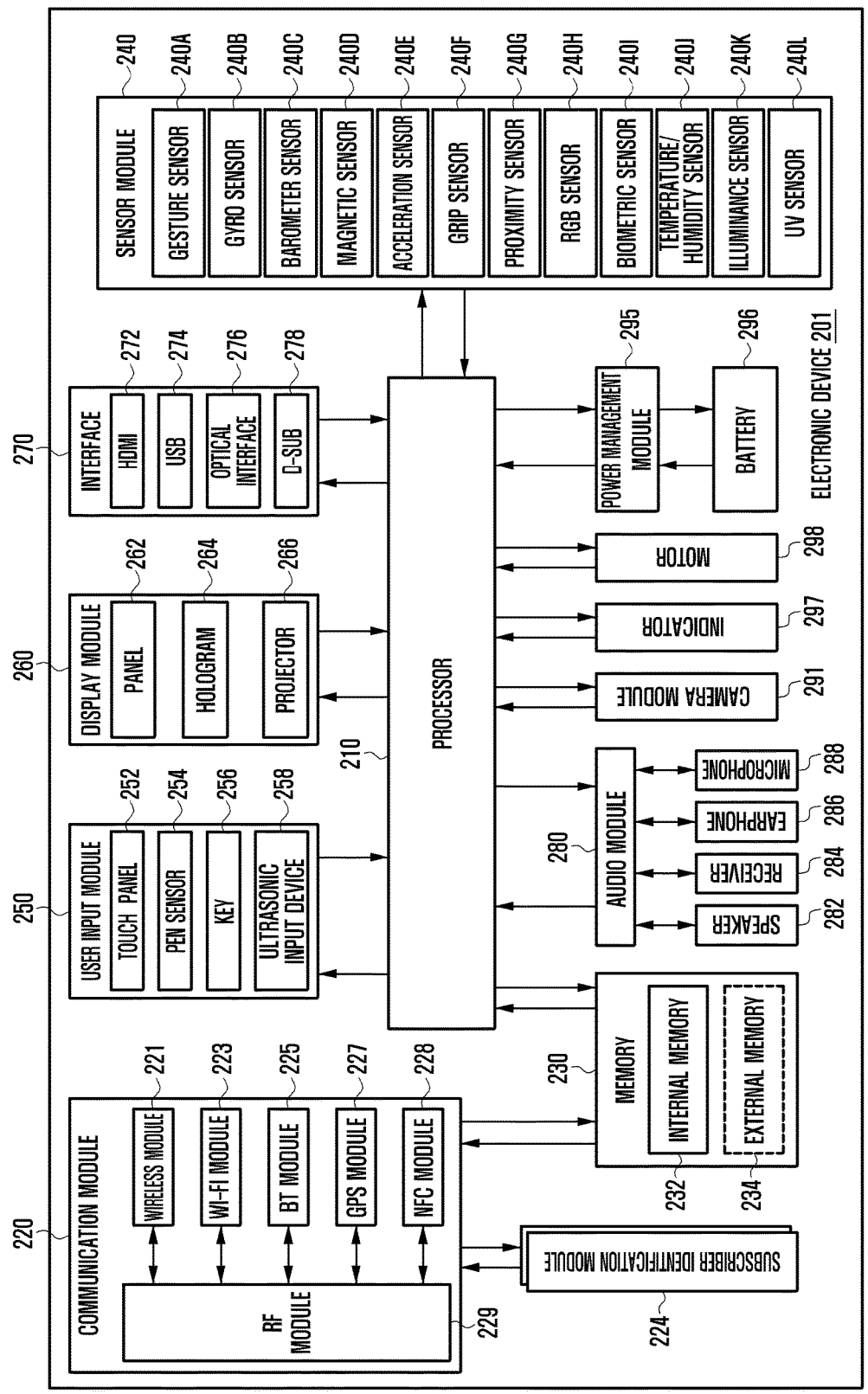
FIG. 2 is a block diagram of an electronic device according to various embodiments of the present invention.

FIG. 2 is a block diagram illustrating a configuration of hardware according to an embodiment of the present invention.

Referring to FIG. 2, hardware 201 may be, for example, the first electronic device 101 illustrated in FIG. 1

The hardware 201 includes one or more processors 210, a subscriber identification module (SIM) card 224, a communication module 220, a memory 230, a sensor module 240, a user input module 250, a display module 260, an interface 270, an audio coder/decoder (codec) 280, a camera module 291, a power management module 295, a battery 296, an indicator 297, a motor 298 and any other similar and/or suitable components.

The processor 210 (e.g., the processor 120) may include one or more application processors (APs), or one or more communication processors (CPs). The AP and the CP are illustrated as being included in the processor 210 in FIG. 2, but may be included in different integrated circuit (IC) packages, respectively. According to an embodiment of the present invention, the AP and the CP may be included in one IC package.

The AP may execute an operating system (OS) or an application program, and thereby may control multiple hardware or software elements connected to the AP and may perform processing of and arithmetic operations on various data including multimedia data. The AP may be implemented by, for example, a system on chip (SoC). According to an embodiment of the present invention, the processor 210 may further include a graphical processing unit (GPU).

The CP may manage a data line and may convert a communication protocol in the case of communication between the electronic device (e.g., the first electronic device 101) including the hardware 201 and different electronic devices connected to the electronic device through the network. The CP may be implemented by, for example, a system on chip (SoC). According to an embodiment of the present invention, the CP may perform at least some of multimedia control functions. The CP, for example, may distinguish and authenticate a terminal in a communication network by using a SIM 224. Also, the CP may provide the user with services, such as a voice telephony call, a video telephony call, a text message, packet data, and the like.

Further, the CP may control the transmission and reception of data by the communication module 220. In the present example, elements such as the CP, the power management module 295, the memory 230, and the like may be separate from the AP. However, according to another embodiment of the present invention, the AP may include at least some (e.g., the CP) of these elements.

According to an embodiment of the present invention, the AP or the CP may load, to a volatile memory, a command or data received from at least one of a non-volatile memory and other elements connected to each of the AP and the CP, and may process the loaded command or data. Also, the AP or the CP may store, in a non-volatile memory, data received from or generated by at least one of the other elements.

The SIM 224 may be inserted into a slot formed in a particular portion of the first electronic device 101. The SIM 224 includes unique identification information (e.g., an integrated circuit card identifier (ICCID)) or subscriber information (e.g., an international mobile subscriber identity (IMSI)).

The memory 230 includes an internal memory 232 and an external memory 234. The memory 230 may be, for example, the memory 130 illustrated in FIG. 1. The internal memory 232 may include, for example, at least one of a volatile memory (e.g., a dynamic random access memory (DRAM), a static RAM (SRAM), a synchronous dynamic RAM (SDRAM), etc.), and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, a not OR (NOR) flash memory, etc.). According to an embodiment of the present invention, the internal memory 232 may be in the form of a solid state drive (SSD). The external memory 234 may further include a flash drive, for example, a compact flash (CF), a secure digital (SD), a micro-SD, a mini-SD, an extreme Digital (xD), a memory stick, or the like.

The communication module 220 may be, for example, the communication module 160 illustrated in FIG. 1. The communication module 220 includes, for example, a cellular module 221, a Wi-Fi module 223, a BT module 225, a GPS module 227, a NFC module 228, and a radio frequency (RF) module 229. For example, the communication module 220 may provide a wireless communication function by using a radio frequency. Additionally or alternatively, the communication module 220 may include a network interface (e.g., a LAN card), a modulator/demodulator (modem), or the like for connecting the hardware 201 to a network (e.g., the Internet, a LAN, a WAN, a telecommunication network, a cellular network, a satellite network, a POTS, or the like).

The RF module 229 is used for transmission and reception of data, for example, transmission and reception of RF signals or electronic signals. Although not illustrated, the RF module 229 may include, for example, a transceiver, a power amplifier module (PAM), a frequency filter, a low noise amplifier (LNA), or the like. Also, the RF module 229 may further include a component for transmitting and receiving electromagnetic waves in a free space in a wireless communication, for example, a conductor, a conductive wire, or the like.

The sensor module 240 includes, for example, a gesture sensor 240A, a gyro sensor 240B, a barometer sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and an ultra violet (UV) sensor 240L. The sensor module 240 measures a physical quantity or may sense an operating state of the first electronic device 101, and converts the measured or sensed information to an electrical signal. Additionally/alternatively, the sensor module 240 may include, for example, an E-nose sensor, an electromyography (EMG) sensor, an electroencephalogram (EEG) sensor, an electrocardiogram (ECG) sensor, a fingerprint sensor, and the like. Additionally or alternatively, the sensor module 240 may include, for example, an E-nose sensor, an EMG sensor, an EEG sensor, an ECG sensor, a fingerprint sensor, and the like. The sensor module 240 may further include a control circuit for controlling one or more sensors included therein.

The user input module 250 includes, for example, a touch panel 252, a pen sensor 254 (e.g., a digital pen sensor), keys 256, and an ultrasonic input unit 258. The user input module 250 may be, for example, the user input module 140 illustrated in FIG. 1. The touch panel 252 recognizes a touch input in at least one of, for example, a capacitive scheme, a resistive scheme, an infrared scheme, and an acoustic wave scheme. Also, the touch panel 252 may further include a controller. A capacitive type touch panel is capable of recognizing proximity as well as a direct touch. The touch panel 252 may further include a tactile layer in order to provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone 288 of the terminal through a pen generating an ultrasonic signal, and to identify data. The ultrasonic input unit 258 is capable of wireless recognition. According to an embodiment of the present invention, the hardware 201 may receive a user input from an external device (e.g., a network, a computer, or a server), which is connected to the communication module 220, through the communication module 220.

The display module 260 includes, for example, a panel 262, a hologram device 264, and a projector 266. The display module 260 may be, for example, the display module 150 illustrated in FIG. 1. The panel 262 may be, for example, a liquid crystal display (LCD) and an active matrix organic light emitting diode (AM-OLED) display, and the like. The panel 262 may be flexible, transparent, or wearable. The panel 262 may be comprised as one module integrated with the touch panel 252. The hologram device 264 displays a three-dimensional image in the air by using interference of light. According to an embodiment of the present invention, the display module 260 may further include a control circuit for controlling the panel 262, the hologram device 264, or the projector 266.

The interface 270 includes, for example, a high-definition multimedia interface (HDMI) 272, a universal serial bus (USB) 274, an optical interface 276, and a d-subminiature (D-sub) 278. Additionally or alternatively, the interface 270 may include, for example, an SD/multi-media card (MMC) interface or an infrared data association (IrDA) interface.

The audio codec 280 bidirectionally converts between voice information and an electrical signal. The audio codec 280 converts voice information, which is input to or output from the audio codec 280, through, for example, a speaker 282, a receiver 284, an earphone 286, the microphone 288 or the like.

The camera module 291 captures images and moving images (i.e., video). According to an embodiment of the present invention, the camera module 291 may include one or more image sensors (e.g., a front lens or a back lens), an image signal processor (ISP), and a flash LED.

The power management module 295 manages power of the hardware 201. The power management module 295 may include, for example, a power management integrated circuit (PMIC), a charger integrated circuit (IC), or a battery gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present invention, the charger IC may include a charger IC for at least one of the wired charging method and the wireless charging method. Examples of wireless charging methods include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery gauge may measure, for example, a residual quantity of the battery 296, or a voltage, a current or a temperature during the charging. The battery 296 supplies power by generating electricity, and may be, for example, a rechargeable battery.

The indicator 297 indicates particular states of the hardware 201 or a part (e.g., the processor 210) of the hardware 201, for example, a booting state, a message state, a charging state and the like. The motor 298 converts an electrical signal into a mechanical vibration. The processor 210 controls the sensor module 240.

The hardware 201 may include a processing unit (e.g., a GPU) for supporting a module TV. The processing unit for supporting a module TV may process media data according to standards such as, for example, digital multimedia broadcasting (DMB), digital video broadcasting (DVB), media flow, and the like. Each of the above-described elements of the hardware 201 according to an embodiment of the present invention may include one or more components, and the name of the relevant element may change depending on the type of electronic device. The hardware 201 according to an embodiment of the present invention may include at least one of the above-described elements. Some of the above-described elements may be omitted from the hardware 201, or the hardware 201 may further include additional elements. Also, some of the elements of the hardware 201 according to an embodiment of the present invention may be combined into one entity, which may perform functions identical to those of the relevant elements before the combination.

The term "module" as used herein may refer to, for example, a unit including one or more combinations of hardware, software, and firmware. The "module" may be interchangeable with terms, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present invention may include at least one of an application-specific integrated circuit (ASIC) chip, a field-programmable gate array (FPGA), and a programmable-logic device for performing certain operations which have been known or may be developed in the future.

Figure 3:
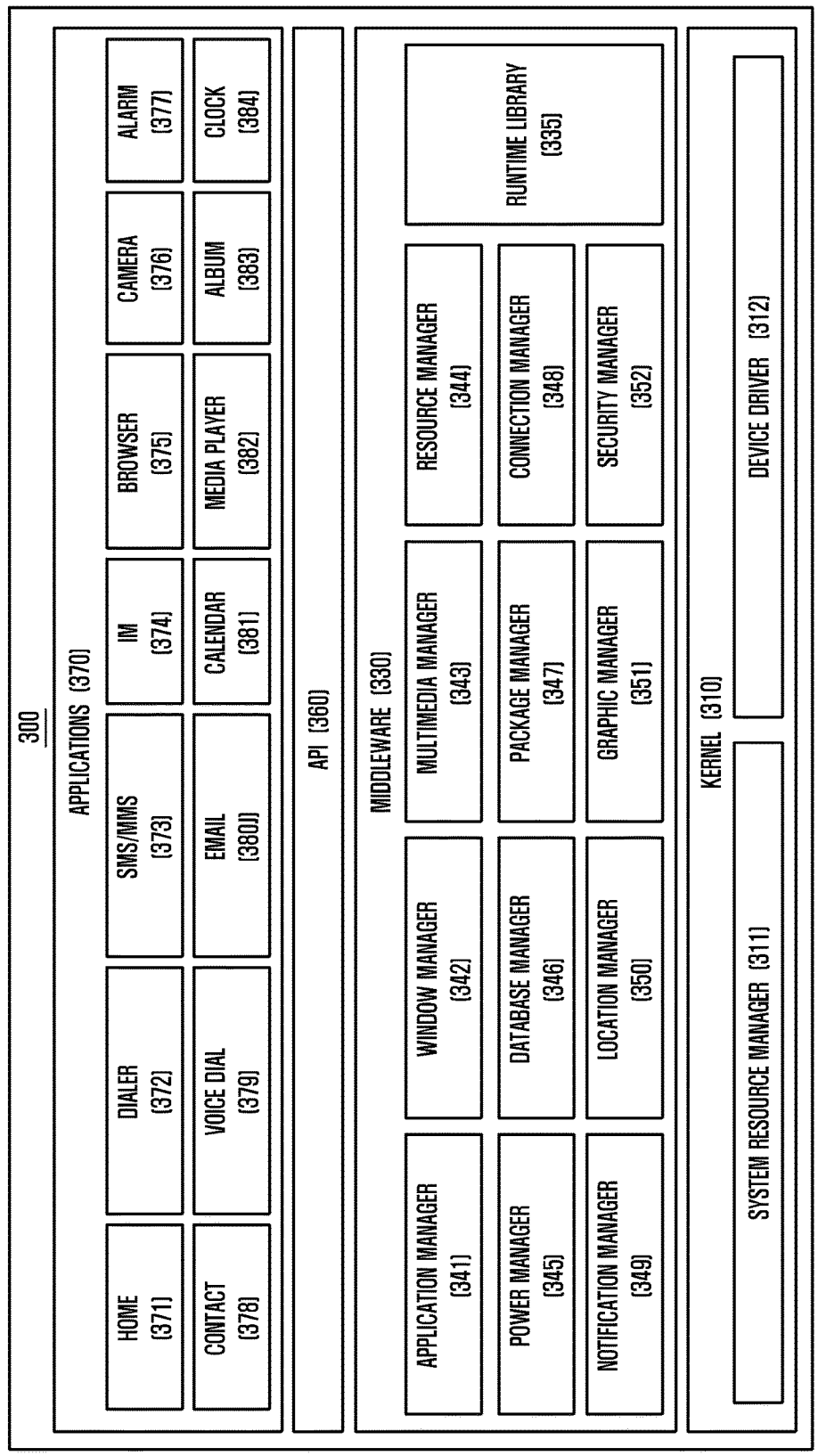
FIG. 3 is a block diagram of a program module according to various embodiment of the present invention.

FIG. 3 is a block diagram illustrating a configuration of a programming module according to an embodiment of the present invention.

Referring to FIG. 3, a programming module 300 may be included (or stored) in the first electronic device 101 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware (e.g., the hardware 201), and may include an OS controlling resources related to an electronic device (e.g., the first electronic device 101) and/or various applications (e.g., an application 370) executed in the OS. For example, the OS may be Android, iOS, Windows, Symbian, Tizen, Bada, and the like.

Referring to FIG. 3, the programming module 300 includes a kernel 310, a middleware 330, an API 360, and/or the application 370.

The kernel 310 (e.g., the kernel 131) includes a system resource manager 311 and/or a device driver 312. The system resource manager 311 may include, for example, a process manager, a memory manager, and a file system manager. The system resource manager 311 performs the control, allocation, recovery, and/or the like of system resources. The device driver 312 may include, for example, a display driver, a camera driver, a Bluetooth driver, a shared memory driver, a USB driver, a keypad driver, a Wi-Fi driver, and/or an audio driver. Also, according to an embodiment of the present invention, the device driver 312 may include an inter-process communication (IPC) driver.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) includes, for example, a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present invention, the runtime library 335 may perform functions that are related to input and output, the management of a memory, an arithmetic function, and/or the like.

The application manager 341 may manage, for example, a life cycle of at least one of the applications 370. The window manager 342 manages GUI resources used on the screen. The multimedia manager 343 detects a format used to reproduce various media files and may encode or decode a media file through a codec appropriate for the relevant format. The resource manager 344 manages resources, such as a source code, a memory, a storage space, and/or the like of at least one of the applications 370.

The power manager 345 operates together with a basic input/output system (BIOS), manages a battery or power, and provides power information and the like used for an operation. The database manager 346 manages a database in such a manner as to enable the generation, search and/or change of the database to be used by at least one of the applications 370. The package manager 347 manages the installation and/or update of an application distributed in the form of a package file.

The connectivity manager 348 manages a wireless connectivity such as, for example, Wi-Fi and Bluetooth. The notification manager 349 displays or reports, to the user, events such as an arrival message, an appointment, a proximity alarm, and the like, in such a manner as not to disturb the user. The location manager 350 manages location information of the electronic device. The graphic manager 351 manages a graphic effect, which is to be provided to the user, and/or a user interface related to the graphic effect. The security manager 352 provides various security functions used for system security, user authentication, and the like. According to an embodiment of the present invention, when the electronic device 101 has a telephone function, the middleware 330 may further include a telephony manager for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present invention, may further include other elements, or may replace the some of the elements with elements, each of which performs a similar function and has a different name.

The API 360 (e.g., the API 133) is a set of API programming functions, and the API 360 may be provided with a different configuration according to an OS. When using Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors perform functions corresponding to the instructions. The non-transitory computer-readable storage medium may be, for example, the memory 230. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module 300 according to an embodiment of the present invention may change depending on the type of OS. The programming module according to an embodiment of the present invention may include one or more of the above-described elements. Alternatively, some of the above-described elements may be omitted from the programming module. Alternatively, the programming module may further include additional elements. The operations performed by the programming module or other elements according to an embodiment of the present invention may be processed in a sequential method, a parallel method, a repetitive method, or a heuristic method. Also, some of the operations may be omitted, or other operations may be added to the operations.

Figure 4A:
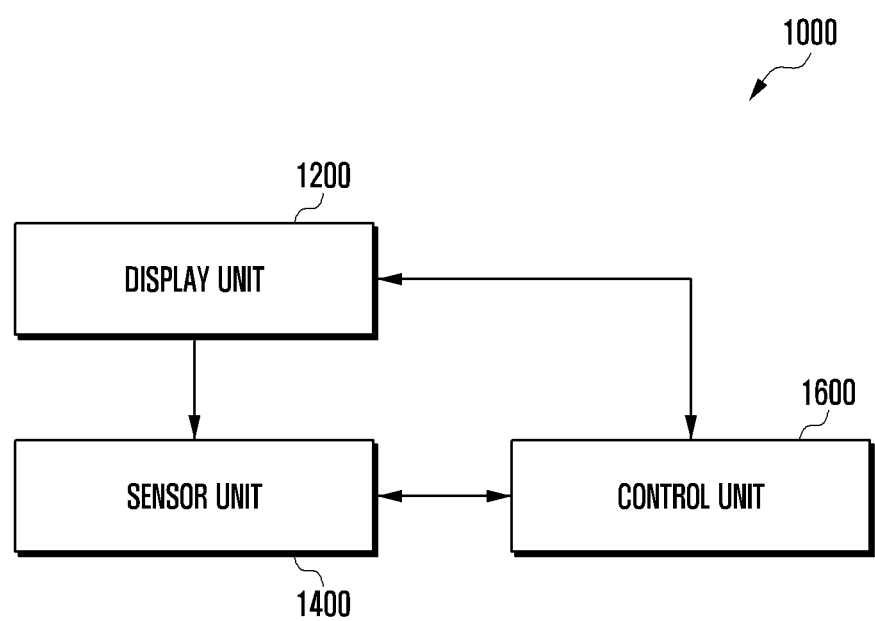
FIGS. 4A and 4B are block diagrams illustrating a configuration of an electronic device including a flexible display according to one embodiment of the present invention.
Figure 4B:
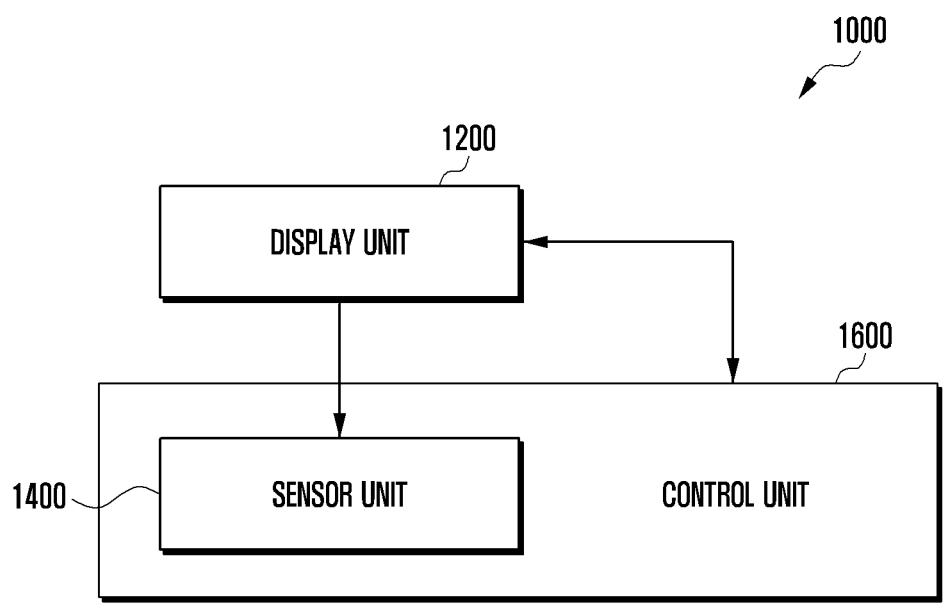
Figure 5:
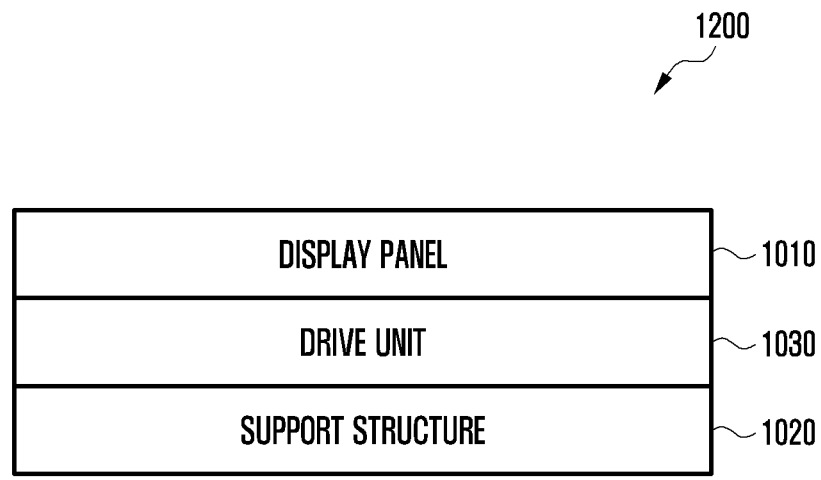
FIG. 5 is a diagram illustrating a basic configuration of the flexible display unit of the electronic device of FIGS. 4A and 4B.

FIGS. 4A and 4B are block diagrams illustrating a configuration of an electronic device including a flexible display according to an embodiment of the present invention, and FIG. 5 is a diagram illustrating a basic configuration of the flexible display unit of the electronic device of FIGS. 4A and 4B.

Referring to FIG. 4A, an electronic device 1000 that includes a flexible display (hereinafter, a "flexible display-equipped electronic device 1000"), according to various embodiments of the present invention, includes a flexible display unit 1200, a sensor unit 1400, and a control unit 1600. In addition, as illustrated in FIG. 4B, the control unit 1600 includes a sensor unit 1400.

Referring to FIG. 5, the flexible display unit 1200 includes a display panel 1010, a support structure 1020 configured to support the display panel, and a drive unit 1030 interposed between the display panel 1010 and the support structure 1020.

As will be described in detail below, a plurality of touch recognition patterns are disposed on each of the display panel 1010 and the support structure 1020, and at least one bending confirmation touch recognition pattern is included in the plurality of touch recognition patterns.

The flexible display-equipped electronic device 1000 may be implemented as various types of portable devices that are portable and have a display function, such as a smartphone, a tablet PC, a mobile phone, a video phone, an e-book reader, a desktop PC, a laptop PC, a netbook computer, a PDA, a PMP, an MP3 player, a mobile medical device, a camera, or an a wearable device (e.g., an HMD, such as electronic eyeglasses, electronic clothes, an electronic bracelet, an electronic necklace, an electronic appcessory, an electronic tattoo, or a smart watch), as well as a stationary device, such as a monitor, a TV, or a kiosk.

The flexible display unit 1200 displays various screens. More specifically, the flexible display unit 1200 may display a screen including various objects. Herein, objects may be various subjects included in an image, a moving picture, or a text. Without being limited thereto, however, the objects may be all kinds of subjects that are displayable on the flexible display unit 1200, such as movie contents, photograph contents, or widgets.

Meanwhile, the flexible display-equipped electronic device 1000 is bendable. Therefore, the flexible display-equipped electronic device 1000 and the flexible display unit 1200 have a flexible structure and should be made of a flexible material.

The sensor unit 1400 senses bending using at least one bending confirmation touch recognition pattern included in the plurality of touch recognition patterns of the flexible display unit 1200.

According to various embodiments of the present invention, since at least one bending confirmation touch recognition pattern is included in the plurality of touch recognition patterns arranged in the display panel 1010 and the support structure 1020 of the flexible display unit 1200, when the flexible display unit 1200 is curved or flexed so that a difference in length or a difference in locations within the support structure 1020 relative to locations within the display panel 1010 occurs between the display panel 1010 and the support structure 1020, an capacitance is changed in a sensing region of the bending confirmation touch recognition pattern included in the display panel 1010 and the support structure 1020 according to the bending of the flexible display unit 1200, and the sensor unit 1400 senses the change of the capacitance and sends a sensing signal to a control unit 1600.

In addition, the control unit 1600 determines the bending degree and the bending direction of the flexible display unit 1200 when the sensor unit 1400 senses the change of the capacitance. For example, when the sensor unit 1400 senses that the change in capacitance between the bending confirmation touch recognition patterns of each of the display panel 1010 and the support structure 1020 increases, the control unit 1600 determines that the flexible display unit 1200 is flexed to a certain degree in a first direction of the upper end based on the increased capacitance. However, when the sensor unit 1400 senses that the change in capacitance between the bending confirmation touch recognition patterns of each of the display panel 1010 and the support structure 1020 decreases, the control unit 1600 determines that the flexible display unit 1200 is flexed to a certain degree in a second direction of the lower end based on the decreased capacitance.

Herein, the flexible display-equipped electronic device 1000 refers to a device that is capable of being flexed, curved, folded, or rolled while maintaining the display characteristics of a flat panel display device. Accordingly, the flexible display-equipped electronic device 1000 may be fabricated on the flexible support structure 1020.

More specifically, the support structure 1020 may be implemented by a plastic substrate (e.g., a polymer film) that is deformable according to an external pressure.

The plastic substrate may have a structure that has a base material, of which the opposite surfaces are treated with a barrier coating. The base material may be implemented by various resins, such as polyimide (PI), polycarbonate (PC), polyethyleneterephtalate (PET), polyethersulfone (PES), polythylenenaphthalate (PEN), and Fiber Reinforced Plastic (FRP). In addition, the barrier coating is performed on the opposite surfaces of the base material, and in order to keep the flexibility of the base material, an organic film or inorganic film may be used for the barrier coating.

For the support structure 1020, instead of a plastic substrate, a material having a flexible characteristic, such as a thin glass or a metal foil, may be used.

The drive unit 1030, which is configured to drive the display panel 1010, applies a driving voltage to a plurality of pixels included in the display panel 1010, and may be implemented in various types such as, an a-si thin film transistor (TFT), an LIPS (Low Temperature Poly-Silicon) TFT, an OTFT (organic TFT).

For example, the display panel 1010 may include an organic light-emitting body formed of a plurality of pixel cells and electrode layers that cover the opposite surfaces of the organic light-emitting body, respectively. The drive unit 1030 may include a plurality of transistors that correspond to the pixel cells of the display panel 1010, respectively, and the control unit 1600 applies an electric signal to the gate of each of the transistors so as to cause the pixel cell connected to each of the transistors to emit light. As a result, an image is displayed.

In addition, the display panel 1010 may also be implemented using, for example, an EL, an electro-phoretic display (EPD), an electro-chromic display (ECD), a liquid crystal display (LCD), an active matrix (AM) LCD, or a Plasma Display Panel (PDP), besides the organic light-emitting diode. When using the LCD, however, a separate back light is required since the LCD is not self-luminous. When no back light is used, the LCD uses the ambient light. Accordingly, in order to use the LCD display panel 1010 without the back light, a requirement, such as an outdoor environment having a large quantity of light, should be satisfied.

The display panel 1010 may include a protection layer thereon. For example, a material such as, ZrO, $CeO_2$, or $ThO_2$, may be used for the protection layer. The protection layer is fabricated in a form of a transparent film to cover the entire surface of the display panel 1010.

Meanwhile, in contrast to the example illustrated in FIG. 5, the flexible display unit 1200 may be implemented with an electronic paper. Electronic paper refers to a display obtained by applying characteristics of ordinary ink to a paper, and is different from an ordinary flat panel display in that electronic paper uses reflected light.

In the cases of using electronic paper, a picture or a character may be changed using electrophoresis with twist balls or capsules.

Meanwhile, when the flexible display unit 1200 is formed of a transparent constituent element, the flexible display unit 1200 may also be implemented as a display device which is transparent as well as bendable. For example, when the support structure 1020 is implemented by a polymer material, such as a transparent plastic, the drive unit 1030 is implemented by a transparent transistor, and the display panel 1010 is implemented by a transparent organic light-emitting layer and a transparent electrode, the flexible display unit 1200 may have a transparent property.

The transparent transistor refers to a transistor fabricated by replacing the opaque silicon of a thin film transistor with a transparent material, such as transparent zinc oxide or titanium oxide. In addition, a novel material, such as indium tin oxide (ITO) or graphene, may be used for a transparent electrode. The graphene refers to a material having a transparent property with a honeycombed planar structure that is formed by carbon atoms that are connected with each other. In addition, the transparent organic light-emitting layer may also be implemented using various materials.

As described above, the flexible display unit 1200 may be bent by a force applied thereto from the outside, so as to deform the flexible display unit 1200.

According to one embodiment of the present invention, the flexible display unit 1200 of the electronic device is capable of sensing bending.

Herein, bending may include, but is not limited to, normal bending, folding, rolling, and twist bending. Normal bending refers to an action that causes the flexible display unit 1200 to be in a bent, curved, or flexed state, and is different from the folding or rolling in that the surfaces of the bent portions are not in contact with each other.

Folding refers to an action that causes the flexible display unit 1200 to be in a folded state. The folding and the normal bending area differentiated from each other according to an extent of bending. For example, when the flexible display unit 1200 is bent such that its curvature radius is less than a predetermined curvature radius, the flexible display unit 1200 is considered to be in the folded state. When the flexible display unit 1200 is bent such that its curvature radius is at least equal to, the flexible display unit 1200 is considered as being bent normally.

Rolling refers to an action that causes the flexible display unit 1200 to be in the rolled state. The rolling may also be determined based on the curvature radius. For example, when a curvature radius is less than the predetermined curvature radius, is continuously sensed over an area that exceeds a predetermined area, the flexible display unit 1200 is considered to be in the rolled state. When the curvature radius, which is less than the predetermined curvature, is sensed in an area that is relatively smaller than the predetermined area, it may be said that the flexible display unit 1200 is in the folded state.

The definitions for various types of deformations as described above are merely provided as examples, and the deformations may be differently defined depending on, for example, the kind, size, weight, and features of the flexible display-equipped electronic device 1000. For example, when the flexible display unit 1200 is bendable to such an extent that its surfaces are in contact with each other, both folding and bending may refer to an action that causes the surfaces of the flexible display unit 1200 to be in contact with each other. Rolling may refer to an action that causes the front and rear surfaces of the flexible display unit 1200 to be in contact with each other.

For the convenience of description, in the present specification, various types of bending as described above, as well as other types of bending, will be collectively referred to as "bending."

The sensor unit 1400 senses bending of the flexible display unit 1200. Here, bending refers to an action that causes the flexible display unit 1200 to be in a curved, bent, or flexed state. Hereinafter, the term "bending" includes various forms of bending such as curving, folding, or flexing.

In order to sense the bending of the flexible display unit 1200, the sensor unit 1400 includes a band sensor on one or each of the front and rear surface of the flexible display unit 1200.

The band sensor is bendable and is characterized in that its resistance value is variable depending on its bent extent. The band sensor may be implemented in various forms, such as an optical fiber band sensor, a pressure sensor, and a strain gauge.

When the flexible display unit 1200 is bent, a difference in length inevitably occurs between the display panel 1010 and the support structure 1020. The prior sensor unit 1400 allows the confirmation of the changed amount itself According to various embodiments of the present invention, the flexible display-equipped electronic device 1000 may be designed in consideration of the change in length between the display panel 1010 and the support structure 1020 that supports the display panel 1010 according to the bending of the flexible display unit 1200.

For example, a plurality of touch recognition patterns may be arranged on the flexible display unit 1200, and among the touch recognition patterns of the flexible display unit 1200, the sensor unit 1400 may include one or more patterns as a pattern for use in confirming curving or flexing, i.e., as a bending confirmation purpose pattern so as to sense bending by using it.

Figure 6:
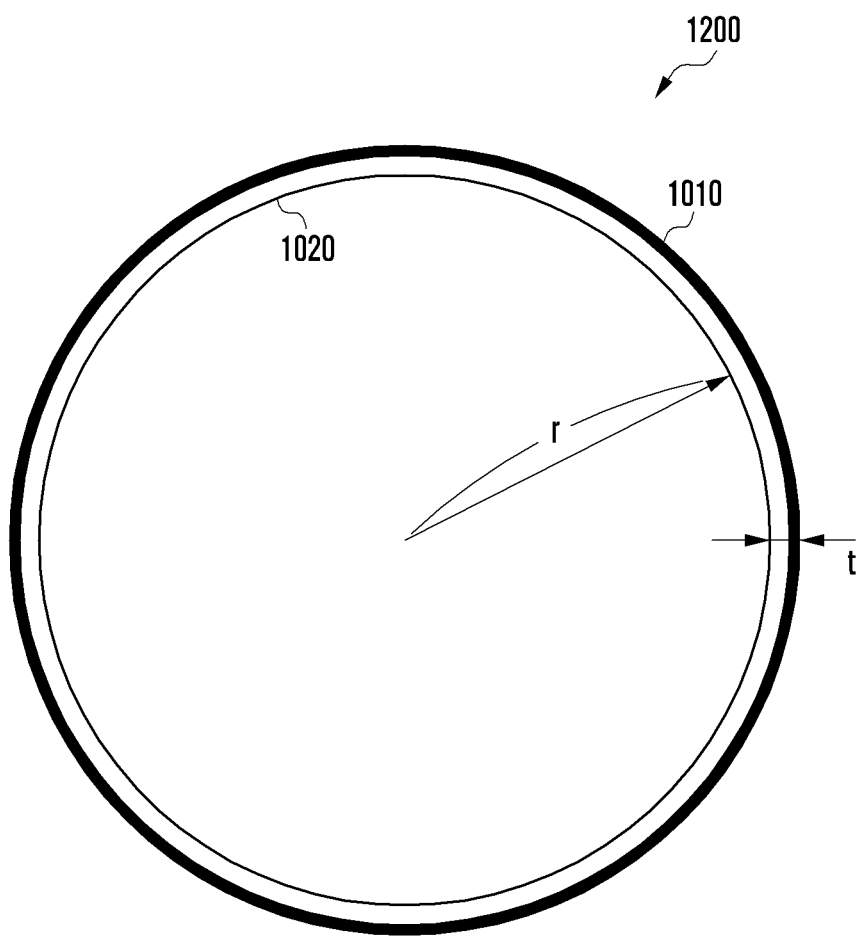
FIG. 6 is a diagram illustrating a concept of occurrence of a difference in length between the display panel and the support structure according to the bending of the flexible display unit of the electronic device according to various embodiments of the present invention.
Figure 7A:
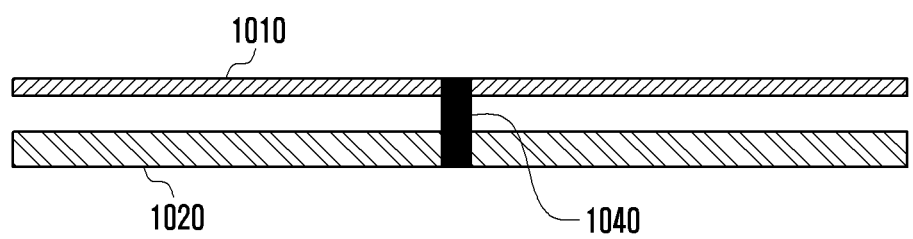
FIG. 7A is a diagram illustrating a design which has, at a central portion, a fixing portion serving as a reference point between the display panel and the support structure of the flexible display unit of the electronic device according to various embodiments of the present invention.
Figure 7B:
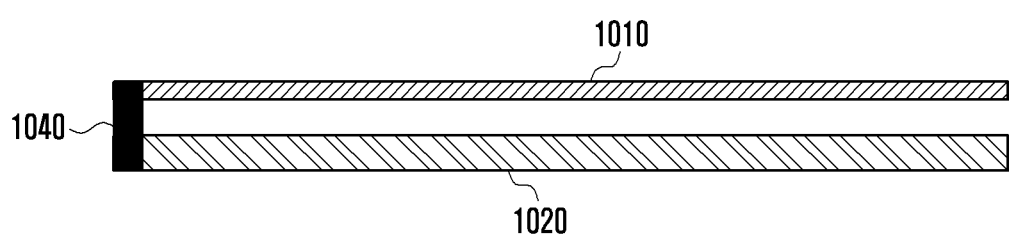
FIG. 7B is a diagram illustrating a design which has, at an end portion, a fixing portion serving as a reference point between the display panel and the support structure of the flexible display unit of the electronic device according to various embodiments of the present invention.

FIG. 6 is a diagram illustrating a concept of an occurrence of a difference in length between a display panel and a support structure according to a bending of the flexible display unit of the electronic device according to various embodiments of the present invention. FIGS. 7A and 7B are diagrams illustrating designs, each of which has a fixing portion serving as a reference point between the display panel and the support structure of the flexible display unit of the electronic device according to various embodiments of the present invention, in which FIG. 7A illustrates a design that has the fixing portion at a central portion and FIG. 7B illustrates a design that has the fixing portion at one end.

For example, according to various embodiments of the present invention, the flexible display unit 1200 of the electronic device may be a watch-type wearable device that includes a display panel 1010 and a support structure 1020 that is fixed to the display panel 1010 or supports the display panel 1010. At this time, the display panel 1010 may serve as a top plate, and the support structure 1020 may serve as a bottom plate.

When the flexible display unit 1200 is curved or flexed, a difference in length inevitably occurs between the display panel 1010 and the support structure 1020.

The circumference of a circle is $\pi D$ or $2\pi r$, in which $\pi$ is the ratio of the circumference of the circle to its diameter, i.e., the circular constant, D is the diameter of the circle, and r is the radius of the circle. Thus, when the flexible display unit 1200 is a watch-type wearable device that has a thickness t of 3 mm and a radius r of 20 mm as illustrated in FIG. 6, the circumference of the display panel 1010 is 144.44 mm (2*3.14*23) and the circumference of the support structure 1020 is 125.6 mm (2*3.14*20). Therefore, the difference in length occurring between the display panel 1010 and the support structure 1020 will be 18.84 mm.

Accordingly, according to various embodiments of the present invention, the flexible display unit 1200 of the electronic device is designed using a point, at which the changed amount is zero (0) when the flexible display unit 1200 is bent, as a reference point, and the reference point may be set as a fixing portion 1040 for the display panel 1010 and the support structure 1020.

Figure 12:
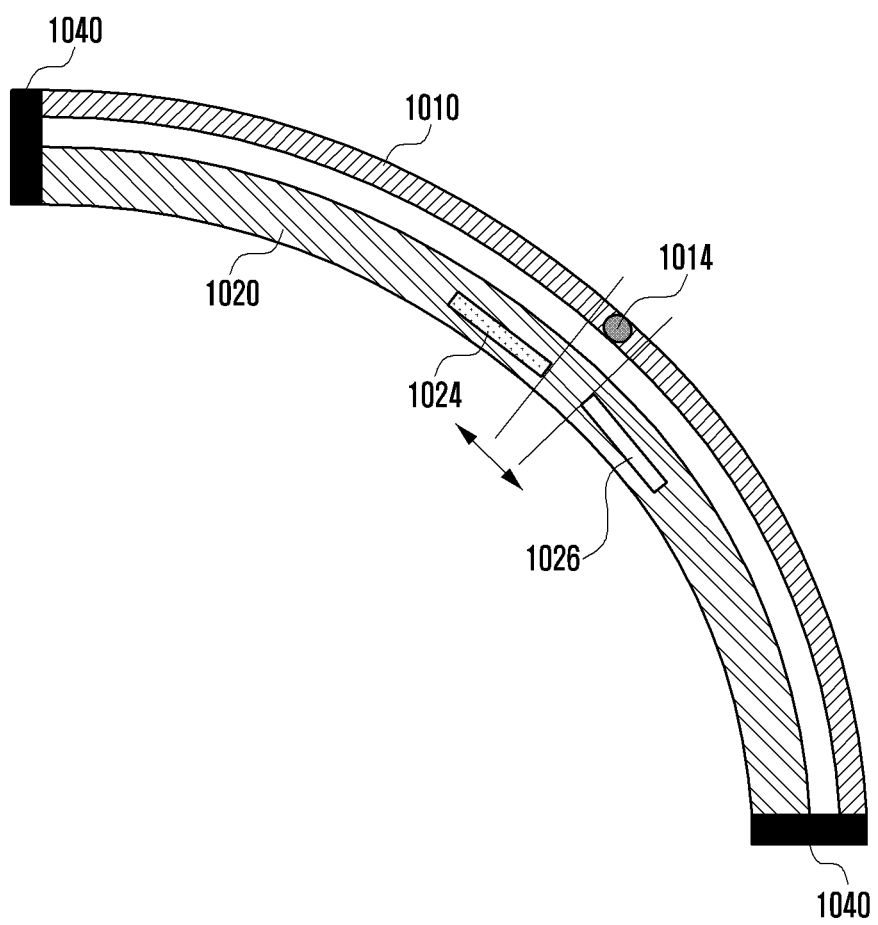

For example, the fixing portion 1040, which serves as the reference point may be included in the central portion of the display panel 1010 and the support structure 1020 (see, for example, FIG. 7A) or may be included in one end or each end of the display panel 1010 and the support structure 1020 (see, for example, FIG. 7B and FIG. 12).

Figure 8A:
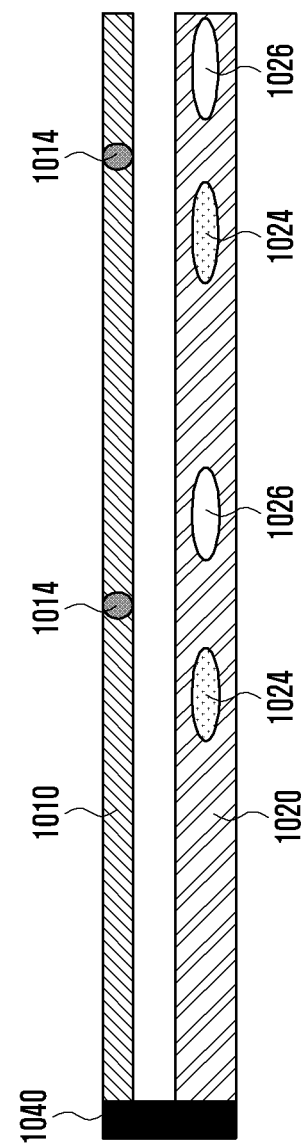
Figure 8B:
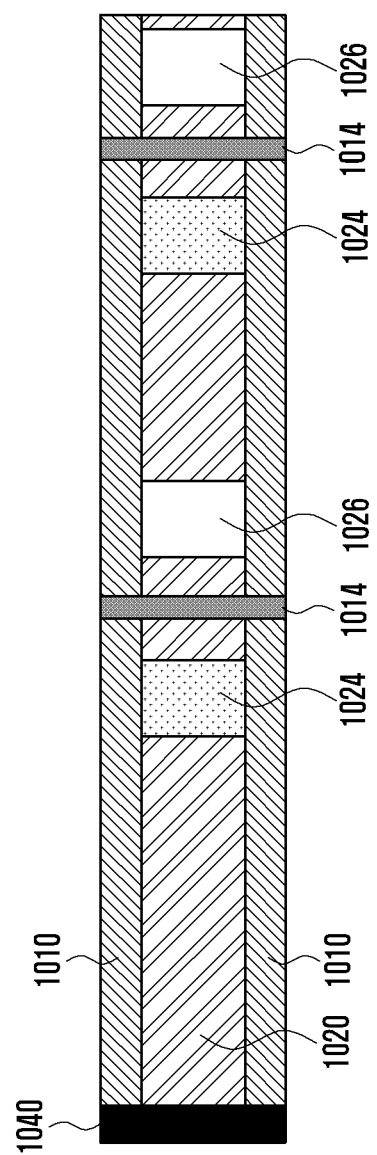

FIGS. 8A and 8B are diagrams illustrating designs that include at least one of the touch recognition patterns of the flexible display unit as a bending confirmation pattern in the designs that include the fixing portion serving as a reference point in one end of the display panel and the support structure, in which FIG. 8A illustrates a view obtained on an X-Z plane and FIG. 8B illustrates a view obtained on an X-Y plane.

Referring to FIGS. 8A and 8B, according to various embodiments of the present invention, a plurality of touch recognition patterns are arranged on the display panel 1010 serving as the top plate. Among the plurality of touch recognition patterns, the flexible display unit 1200 of the electronic device includes a plurality of first patterns 1014 (indicated by circles in FIG. 8A) as bending confirmation patterns.

In addition, a plurality of touch recognition patterns is also arranged on the support structure 1020 serving as the bottom plate. Among the plurality of touch recognition patterns, the flexible display unit 1200 of the electronic device includes a plurality of second patterns 1024 and 1026 (indicated by hatched ovals and non-hatched ovals, respectively in FIG. 8A) in ± directions from each of the first bending confirmation patterns 1014 included in the display panel 1010, as bending confirmation patterns. With reference to each of the first bending confirmation patterns 1014, the left side is a first (+) direction and the right side is a second (−) directions.

Each of the first patterns 1014 and the second patterns 1024 and 1026 are connected to ± ports of a touch panel IC, that is, is connected to only one of a positive port and a negative port so as to recognize a changed amount of capacitance.

According to various embodiments of the present invention, the flexible display unit 1200 of the electronic device may include a separate channel in the touch panel IC so as to confirm bending.

Figure 9:
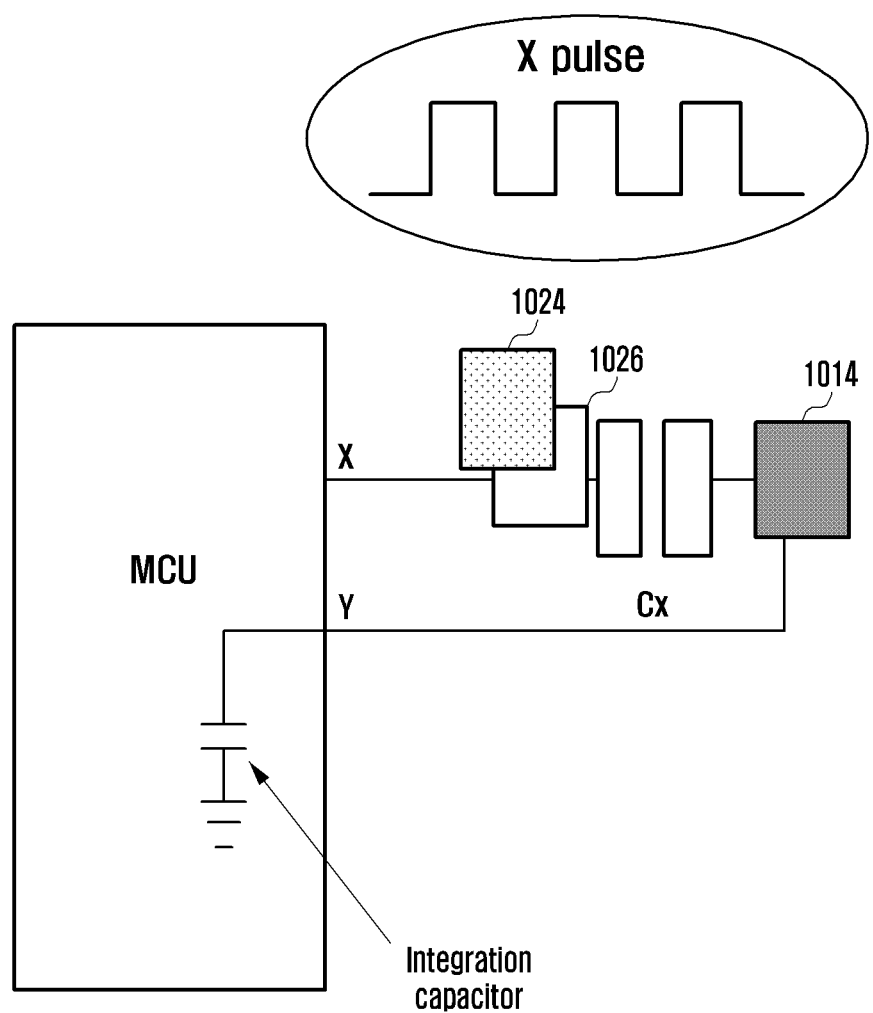
FIG. 9 is a diagram illustrating a design including a separate bending confirmation channel in the touch panel IC of the flexible display unit of the electronic device according to various embodiments of the present invention.

According to an embodiment of the present invention illustrated in FIG. 9, the bending extent and the bending direction can be confirmed by comparing the capacitances in the sensing areas of the second bending confirmation patterns 1024 included in the support structure 1020 after electric charges are charged to the touch recognition patterns of the display panel 1010.

However, the bending extent and the bending direction can be confirmed by comparing capacitances in the sensing areas of the first bending confirmation patterns 1014 included in the display panel 1010 after electric charges are charged to the touch recognition patterns of the support structure 1020.

Figure 10A:
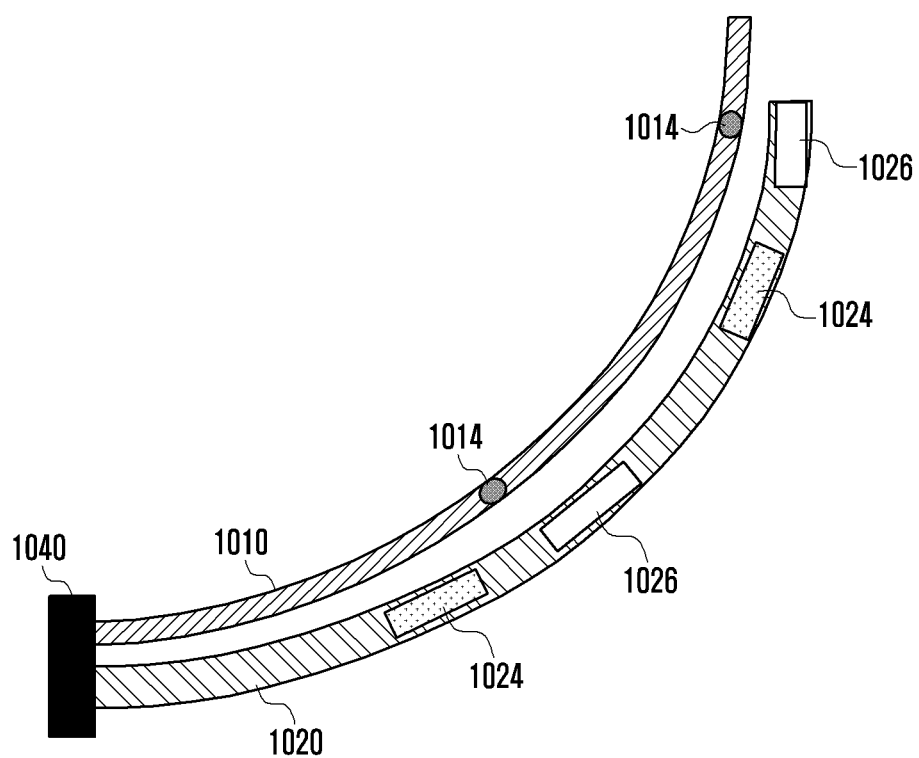
Figure 10B:
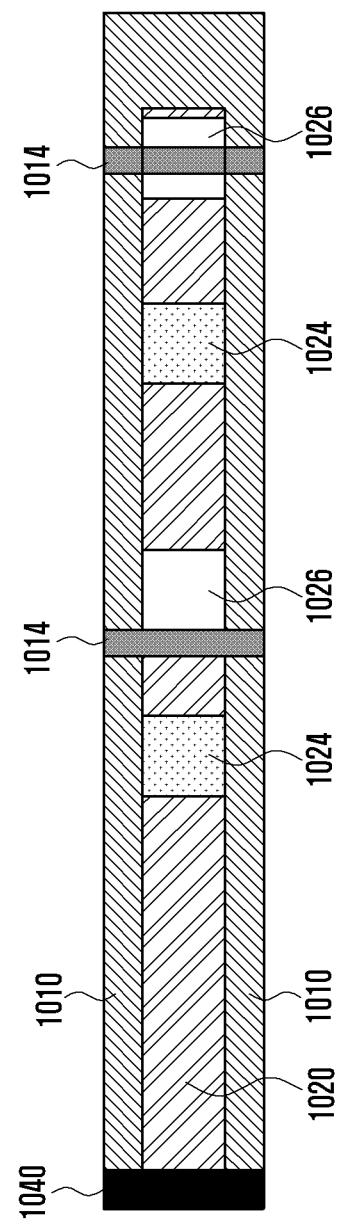

FIGS. 10A and 10B are diagrams illustrating a method of determining the bending direction of a top plate-bottom plate moving structure, based on a change in capacitance according to the bending of the flexible display unit of an electronic device in a first direction according to various embodiments of the present invention.

When the display panel 1010 is flexed in a first (+) direction, for example, upwardly as illustrated in FIG. 10A, the end of the display panel 1010 extends beyond the end of the support structure 1020 in an upwards direction. In addition, as illustrated in FIG. 10B, among the second bending confirmation patterns 1024 and 1026 of the support structure 1020, the second bending confirmation patterns 1026, in the second (−) direction with reference to the first bending confirmation patterns 1014 of the display unit 1010, get closer to the first bending confirmation patterns 1014 of the display panel 1010 so that the capacitance between the patterns 1014 and 1026 increases, and the second bending confirmation patterns 1024 in the first (+) direction move away from the first bending confirmation patterns 1014 of the display panel 1010 so that the capacitance between the patterns 1014 and 1026 decreases. As a result, the control unit 1600 can determine that the flexible display unit 1200 has been finally flexed upwardly, that is, in the first direction.

Figure 11A:
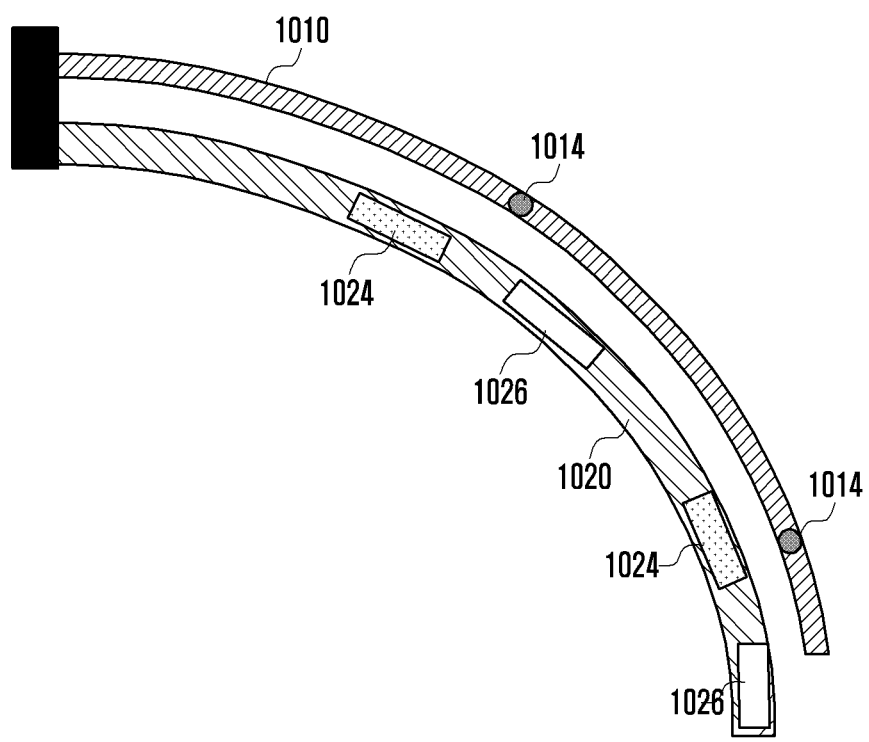
Figure 11B:
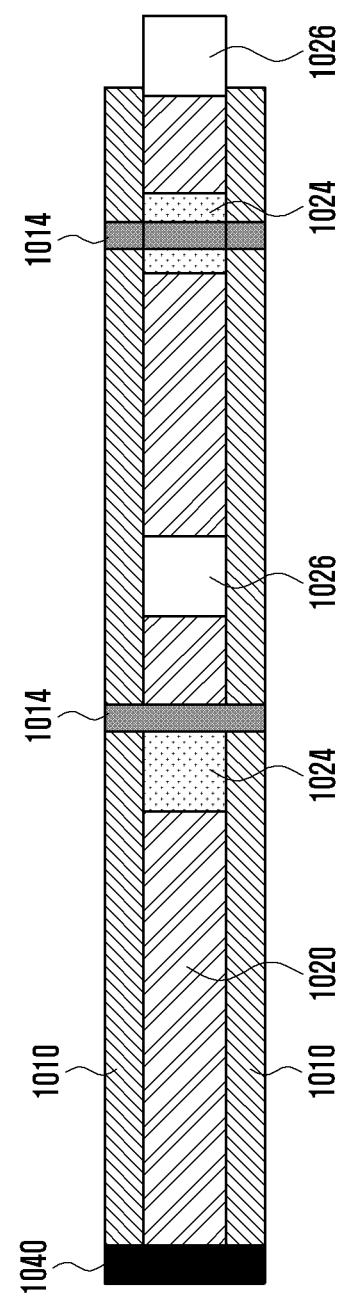

FIGS. 11A and 11B are diagrams illustrating another method of determining the bending direction of the top plate-bottom plate moving structure, based on a change in capacitance according to the bending of the flexible display unit of the electronic device according to various embodiments of the present invention in a second direction.

When the display panel 1010 is flexed in a second direction, for example, downwardly as illustrated in FIG. 11A, the display panel 1010 becomes shorter than the support structure 1020. In addition, as illustrated in FIG. 11B, among the second bending confirmation patterns 1024 and 1026 of the support structure 1020, the second bending confirmation patterns 1026, in the second (−) direction with reference to the first bending confirmation patterns 1014 of the display unit 1010, move away from the first bending confirmation patterns 1014 of the display panel 1010 so that the capacitance between the patterns 1014 and 1026 decreases, and the second bending confirmation patterns 1024 in the first (+) direction get closer to the first bending confirmation patterns 1014 of the display panel 1010 so that the capacitance between the patterns 1014 and 1024 increases. As a result, the control unit 1600 can determine that the flexible display unit 1200 has been finally flexed downwardly, that is, in the second direction.

As described above, according to various embodiments of the present invention, as the flexible display unit 1200 of the electronic device includes channels configured in the ± directions, it is possible to determine the bending direction as well as the bending extent.

FIG. 12 is a diagram illustrating another method of determining the bending direction of the top plate-bottom plate moving structure based on a change in capacitance according to the flexure of the flexible display unit of the electronic device according to various embodiments of the present invention.

Referring to FIG. 12, according to various embodiments of the present invention, the flexible display unit 1200 of the electronic device includes fixing portions 1040, which serve as the reference of the flexible panel assembly of the top plate-bottom plate moving structure, at each end of the display panel 1010 and the support structure 1020. The display panel 1010 and the support structure 1020 are made of flexible materials.

As the flexible panel assembly is flexed, the length the central portion of the flexible panel assembly may increase.

Therefore, the control unit 1600 can confirm the extent of bending and the bending direction by comparing the changed amounts of capacitance in the respective sensing areas of the first bending confirmation patterns 1014 and the second patterns 1024 and 1026, which are included in the display panel 1010 and the support structure 1020, respectively, after electric charges are charged to the touch recognition patterns of each of the display panel 1010 and the support structure 1020.

As an alternative, the control unit 1600 can confirm the bending extent and the bending direction by comparing the capacitances in the sensing area of each of one or more second bending confirmation patterns 1024 and 1026 included in the lower support structure 1020.

When the locations of the first bending confirmation patterns 1014 and the second bending confirmation patterns 1024 and 1026 of the display panel 1010 and the location of the support structure 1020 are set, it is possible to linearly adjust the arrangement distance of touch recognition patterns or linearly design a touch signal recognition threshold level by using the fact that the changed amount according to the bending is changed linearly as the distance from the fixing portion 1040 increases.

Figure 13:
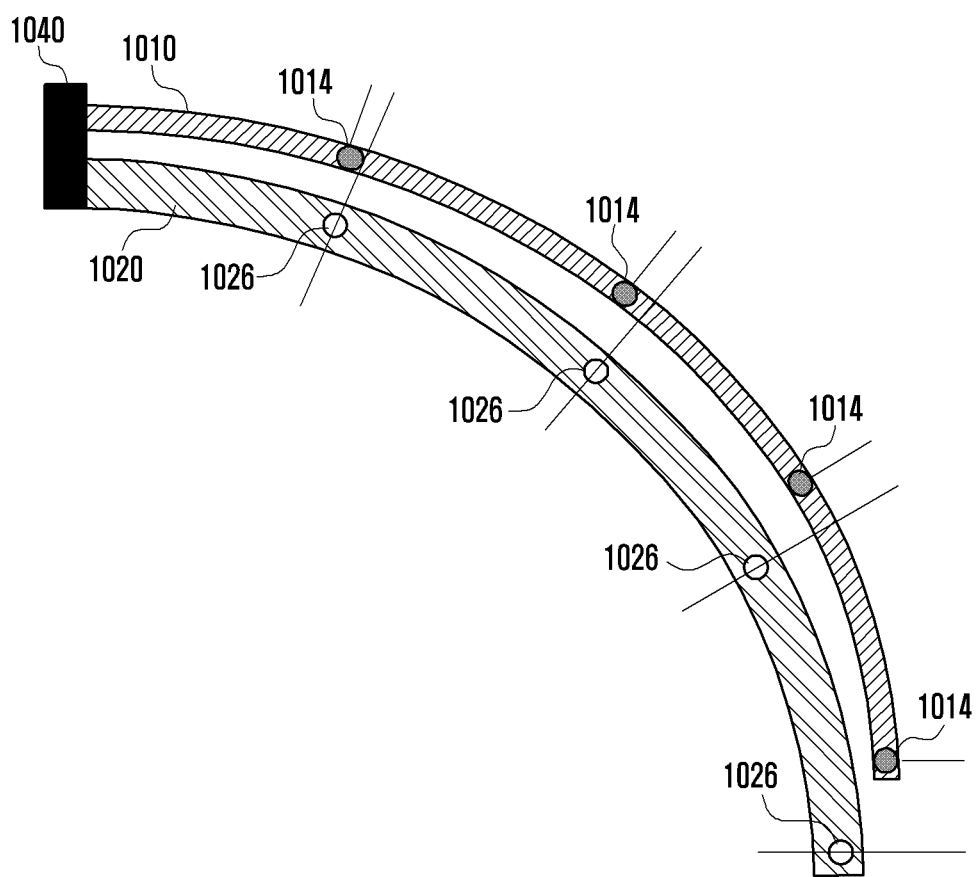
FIG. 13 is a diagram illustrating a status view of FIG. 11, which is obtained on the X-Z plane in order to describe a method of confirming of a changed amount in each section through a design of a plurality of touch recognition patterns.
Figure 14:
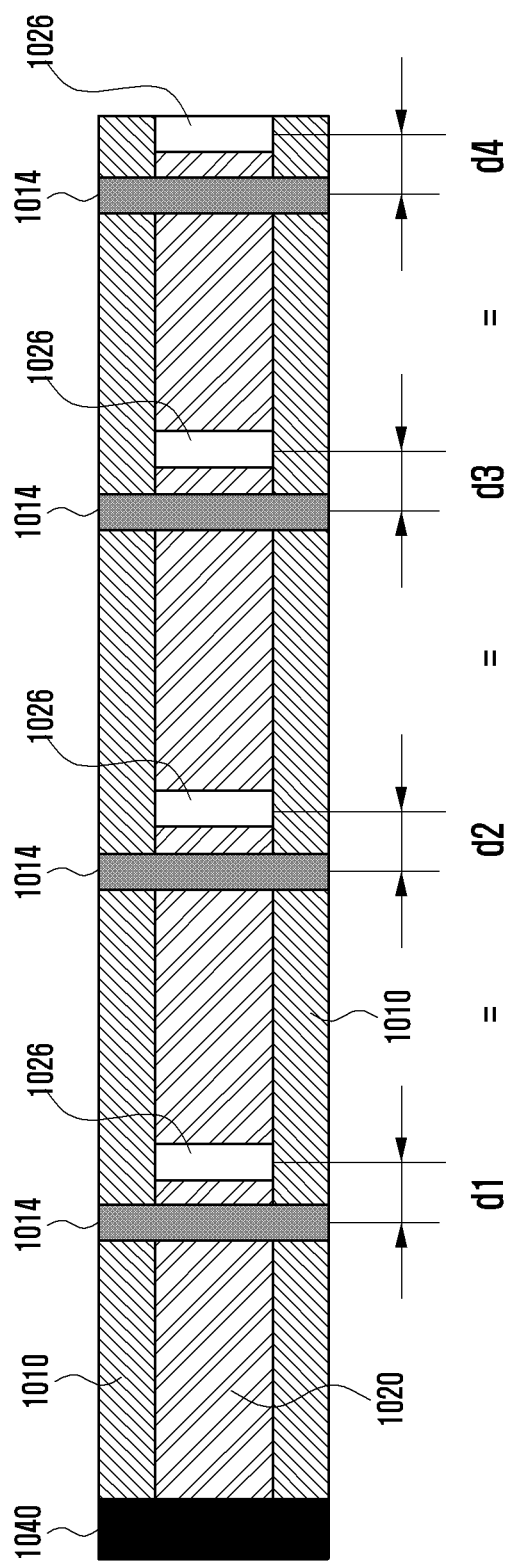
Figure 15:
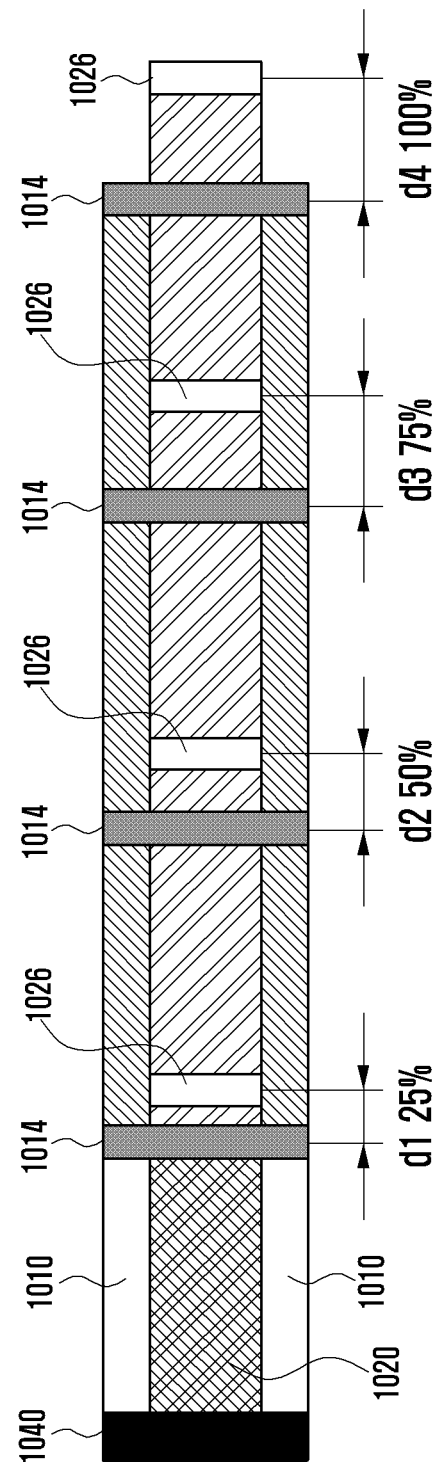
Figure 16:
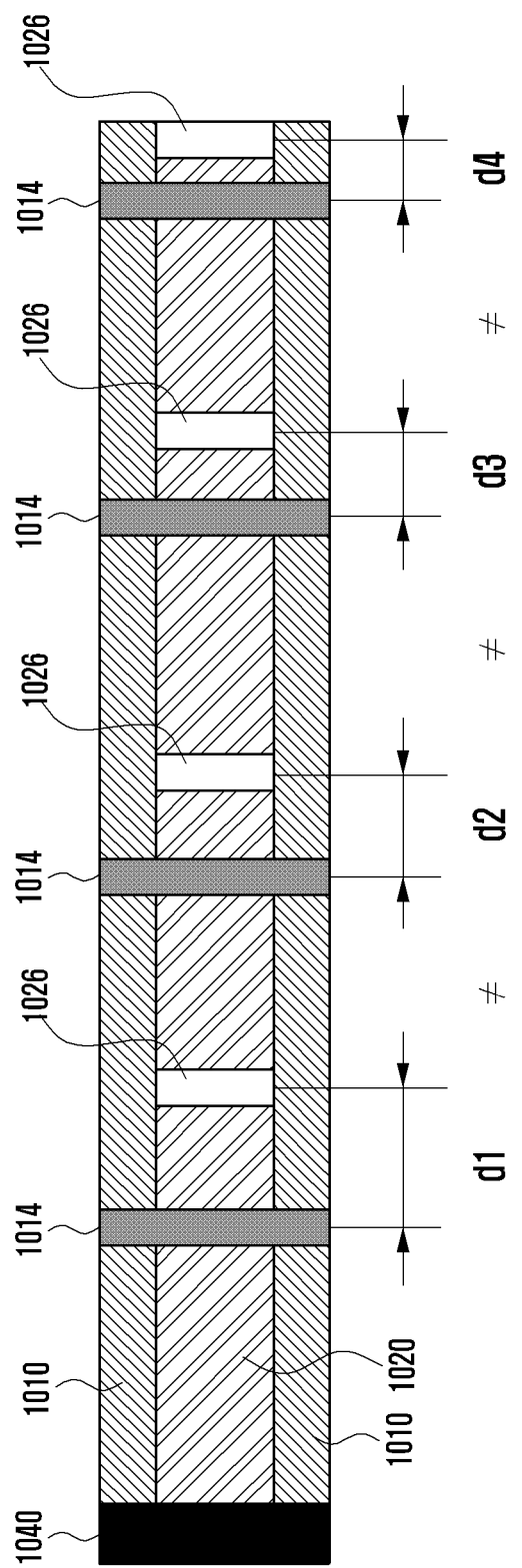
Figure 17:
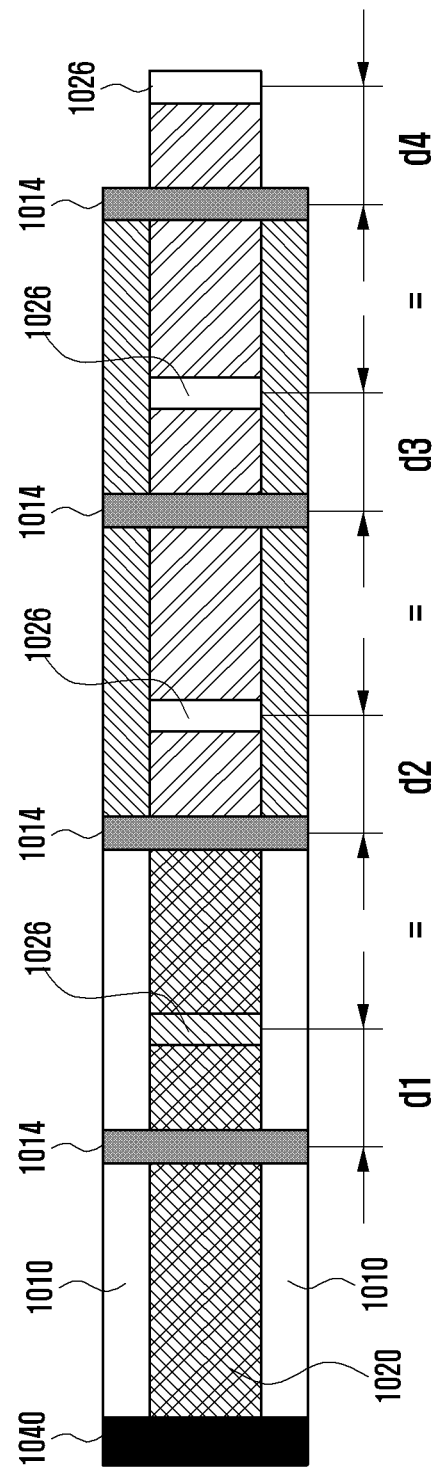

FIG. 13 is a diagram illustrating a status view corresponding to FIGS. 11A and 11B, in which FIG. 13 illustrates a method of confirming a changed amount of each section through a design of a plurality of touch recognition patterns, FIG. 14 is a diagram illustrating the patterns of the display panel and the support structure of FIGS. 11A and 11B which are designed to have the same intervals, FIG. 15 is a diagram illustrating that the intervals between the patterns of FIG. 14 are linearly changed when being deformed at the same curvature, FIG. 16 is a diagram illustrating the patterns of the display panel and the support structure of FIGS. 11A and 11B which are designed to have different intervals, and FIG. 17 is a diagram illustrating that the intervals between the patterns are changed at the same curvature when being deformed at the same interval, in which FIG. 17 illustrates a view obtained on the X-Y plane.

Referring to FIG. 13, in view of the change of the extent that the support structure 1020 extends beyond the display panel 100 in a downward direction, the changed amount of distance from each measuring point (i.e., patterns 1014 and 1026) to the fixing portion 1040 may be proportional to the distance from each measuring point to the fixing portion 1040.

For example, as illustrated in FIGS. 11A and 11B, when the display panel 1010 is flexed in the second direction with reference to the Z-axis, for example, downwardly, among the second bending confirmation patterns 1024 and 1026 of the support structure 1020, the second bending confirmation patterns 1026, in the second (−) direction with reference to each first bending confirmation pattern 1014 of the display panel 1010, move away from the first bending confirmation patterns 1014 of the display panel 1010 so that the capacitance between the patterns 1014 and 1026 decreases and, at the same time, the intervals between the second bending confirmation patterns 1024 and 1026 in the second (−) direction may become different from each other.

Even if the display panel 1010 is bent in any one direction with reference to the Z-axis, when the intervals between the patterns of the display panel 1010 and the support structure 1020 are designed to have the same interval (see intervals d1, d2, d3, and d4 in FIG. 14) and deformed at the same curvature, the pattern interval between the display panel 1010 and the support structure 1020 may be linearly changed (see intervals, d1, d2, d3, and d4 in FIG. 14).

For example, when the display panel 1010 is flexed with reference to the Z-axis, for example, downwardly, as illustrated in FIG. 14, when the flexible display unit 1200, which is designed such that the patterns of the display panel 1010 and the support structure 1020 have the same intervals d1, d2, d3, and d4, is deformed at the same curvature, the pattern interval between the display panel 1010 and the support structure 1020 may be linearly deformed as illustrated in FIG. 15, resulting in changed intervals d1, d2, d3, and d4 in FIG. 15.

As a result, the threshold levels at respective points may be differentially designed by recognizing the same curvature.

As an alternative, when the flexible display unit 1200, which is changed such that the patterns of the display panel 1010 and the support structure 1020 are designed to have different intervals (see d1, d2, d3, and d4 in FIG. 16), is deformed at the same curvature as illustrated in FIG. 16, the pattern interval between the display panel 1010 and the support structure 1020 may be changed at the same interval (see intervals d1, d2, d3, and d4 in FIG. 17) at the final end (i.e., as an end result of bending the display flexible display unit 1200) as illustrated in FIG. 17.

As a result, the threshold levels at respective points may be equally designed by recognizing the same curvature.

As described above, according to various embodiments of the present invention, since the threshold level or the arrangement of sensing units may be differently designed for each channel by using the fact that when the flexible display unit 1200 is deformed at the same curvature, the distance of each measurement point is linearly changed, and the data may be stored in a separate record medium, the accuracy of measurement can be improved and the changed amount of curvature in each section can be determined.

In addition, according to various embodiments of the present invention, when the flexible display unit 1200 of the electronic device is configured two-dimensionally on the X-Y plane, it is possible to determine the bending extent and direction of a paper-type display panel, and when arranging and disposing touch recognition patterns, the touch recognition patterns may be arranged with reference to the maximum bending amount of the display panel.

For example, referring to FIG. 6, when a band-type device having a thickness of 3 mm is bendable to a circular shape having the maximum diameter of 20 mm, the intervals of touch recognition patterns may be configured, under the assumption that that the maximum length difference at the terminal end is 18.84 mm.

As described above, according to various embodiments of the present invention, the flexible display unit of the electronic device is different from a band sensor in that since a plurality of touch recognition patterns are arranged, a bending direction can be determined, and since the arrangement intervals of the touch recognition patterns and the recognition threshold levels are differently applied, a recognition rate can be optimized and a changed amount of each section can be confirmed. The use of the flexible display unit is not limited to the measurement of an angle of a finger or a joint. In a comb-type electrode structure having electrodes arranged at regular intervals, it is possible to consider the fact that even with the same flexural curvature the inter-electrode distance increases toward an end, and it is possible to measure the bending amount in each section as well as to discriminate the bending direction in each section.

According to various embodiments of the present invention, since the bending extent can be confirmed by using a display panel that is embedded in a portable electronic device, no additional cost is incurred in order to implement such a function, and a bending direction can be determined by arranging a plurality of touch recognition patterns. In addition, by considering the fact that a deformation extent is linearly changed toward the end of the fixing portion when bending is applied, a design for optimizing a recognition rate is enabled by differentially applying the arrangement intervals of touch recognition patterns and threshold levels, and confirmation of a changed amount in each section is enabled through the design of a plurality of touch recognition patterns.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An electronic device including a flexible display, the electronic device comprising:
    a flexible display unit including a display panel serving as a top plate and a support structure configured to support the display panel;
    a control unit configured to sense bending of the flexible display unit, by determining a bending extent and a bending direction of the flexible display unit; and
    a plurality of touch recognition patterns are arranged on the display panel and the support structure, and the arranged touch recognition patterns include bending confirmation patterns;
    wherein the bending confirmation patterns comprise first bending confirmation patterns and second bending confirmation patterns;
    wherein the first bending confirmation patterns are included in the display panel and the second bending confirmation patterns are included in the support structure;
    wherein the second bending confirmation patterns are arranged in first and second directions with reference to the first bending confirmation patterns, respectively, and
    wherein the first and the second directions with reference to the first bending confirmation patterns are opposite to each other.

2. The electronic device of claim 1, wherein the flexible display unit further includes at least one fixing portion that is a reference point, at which a relative location at a time of bending is not changed.

3. The electronic device of claim 2, wherein the at least one fixing portion is included in at least one end of the display panel and the support structure.

4. The electronic device of claim 1, wherein the control unit determines the bending extent and the bending direction by confirming a changed amount of capacitance in a sensing area of the bending confirmation pattern of the support structure after charging electric charges to the plurality of touch recognition patterns of the display panel.

5. The electronic device of claim 1, wherein the control unit determines the bending extent and the bending direction by comparing changed amounts of capacitance in a sensing area of the bending confirmation pattern of the display panel after charging electric charges to the plurality of touch recognition patterns of the support structure.

6. The electronic device of claim 1, wherein the control unit determines the bending extent and the bending direction by comparing changed amounts of capacitance in a sensing area of each of the bending confirmation pattern of the display panel and the bending confirmation pattern of the support structure after charging electric charges to the plurality of touch recognition patterns of each of the display panel and the support structure.

7. The electronic device of claim 1, wherein the control unit determines the bending extent and the bending direction by comparing changed amount of capacitance in a sensing area of each of two or more bending confirmation patterns of the support structure.

8. The electronic device of claim 1, wherein, when the display panel is flexed in a first direction with reference to a predetermined axis, the control unit determines that the flexible display unit has been finally flexed in the first direction.

9. The electronic device of claim 1, wherein, when the display panel is flexed in a second direction with reference to a predetermined axis, the control unit finally determines that the flexible display unit has been finally flexed in the second direction.

10. The electronic device of claim 1, wherein the first bending confirmation patterns and the second bending confirmation patterns of the support structure have equal intervals therebetween and different threshold levels for each of corresponding sets of patterns in the display panel and the support structure.

11. The electronic device of claim 1, wherein the first bending patterns and the second bending confirmation patterns have different intervals therebetween and equal threshold levels for each of corresponding sets of patterns in the display panel and the support structure.

12. The electronic device of claim 1, further comprising a recording medium that stores data of threshold levels for respective channels or data of an arrangement of sending unit in the flexible display unit of the electronic device.

* * * * *